United States Patent
Ichikawa

(10) Patent No.: US 10,367,212 B2
(45) Date of Patent: Jul. 30, 2019

(54) FUEL CELL SYSTEM AND CONTROL METHOD FOR FUEL CELL SYSTEM

(71) Applicant: NISSAN MOTOR CO., LTD., Yokohama-shi, Kanagawa (JP)

(72) Inventor: Yasushi Ichikawa, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 144 days.

(21) Appl. No.: 15/309,701

(22) PCT Filed: May 9, 2014

(86) PCT No.: PCT/JP2014/062526
§ 371 (c)(1),
(2) Date: Nov. 8, 2016

(87) PCT Pub. No.: WO2015/170413
PCT Pub. Date: Nov. 12, 2015

(65) Prior Publication Data
US 2017/0149077 A1 May 25, 2017

(51) Int. Cl.
| H01M 8/04746 | (2016.01) |
| H01M 8/04089 | (2016.01) |
| H01M 8/04537 | (2016.01) |
| H01M 8/04828 | (2016.01) |
| H01M 8/0438 | (2016.01) |
| H01M 8/04119 | (2016.01) |
| H01M 8/1018 | (2016.01) |

(52) U.S. Cl.
CPC ... *H01M 8/04753* (2013.01); *H01M 8/04097* (2013.01); *H01M 8/04141* (2013.01); *H01M 8/04388* (2013.01); *H01M 8/04611* (2013.01); *H01M 8/04828* (2013.01); *H01M 8/1018* (2013.01)

(58) Field of Classification Search
CPC ........ H01M 8/04753; H01M 8/04097; H01M 8/04611
See application file for complete search history.

(56) References Cited

U.S. PATENT DOCUMENTS

2007/0248858 A1 * 10/2007 Blaszczyk ......... H01M 8/04089
429/415
2012/0107711 A1 5/2012 Tomita et al.
2012/0315559 A1 12/2012 Noh et al.

FOREIGN PATENT DOCUMENTS

| JP | 2008-190336 A | 8/2008 |
| JP | 2011-003507 A | 1/2011 |
| JP | 2012-255429 A | 12/2012 |

* cited by examiner

*Primary Examiner* — Lisa S Park
(74) *Attorney, Agent, or Firm* — Foley & Lardner LLP

(57) ABSTRACT

A fuel cell system supplies anode gas and cathode gas to a fuel cell and causes the fuel cell to generate power according to a load. The fuel cell system includes a supply passage configured to supply the anode gas to the fuel cell, a pressure control valve that provided in the supply passage and configured to adjust a pressure of the anode gas supplied to the fuel cell, and a discharge passage configured to discharge the anode gas from the fuel cell. The fuel cell system includes an ejector that provided in the supply passage configured to suck the anode gas discharged to the discharge passage and circulate the anode gas to the fuel cell by the anode gas supplied from the pressure control valve, and a control unit configured to pulsate the pressure of the anode gas supplied to the ejector.

16 Claims, 16 Drawing Sheets

FUEL CELL SYSTEM AND CONTROL METHOD FOR FUEL CELL SYSTEM

TECHNICAL FIELD

This invention relates to a fuel cell system for supplying anode gas and cathode gas to a fuel cell and a control method for fuel cell system.

BACKGROUND ART

A circulation-type fuel cell system in which an ejector is provided in a supply passage for supplying anode gas to a fuel cell and excess anode gas not consumed by the fuel cell is sucked by the ejector and supplied to the fuel cell is known as one of fuel cell systems.

JP2008-190336A discloses a technique for controlling an injection timing of an injector provided upstream of an ejector so that a supply flow rate obtained by adding an injection flow rate from the injector and a suction flow rate by the ejector becomes a flow rate satisfying power required from a load.

SUMMARY OF INVENTION

However, since a discharge flow rate from the ejector is controlled using the injector in the above technique, a flow rate necessary for power generation is ensured, but excess anode gas circulated to the fuel cell by the ejector may possibly become insufficient.

The present invention was developed, focusing on such a problem and aims to provide a fuel cell system and a control method for fuel cell system for ensuring a circulation flow rate of anode gas circulated to a fuel cell by an ejector.

According to one aspect of the present invention, a fuel cell system supplies anode gas and cathode gas to a fuel cell and causes the fuel cell to generate power according to a load. The fuel cell system includes a supply passage configured to supply the anode gas to the fuel cell, a pressure control valve that provided in the supply passage and configured to adjust a pressure of the anode gas supplied to the fuel cell, and a discharge passage configured to discharge the anode gas from the fuel cell. Furthermore, the fuel cell system includes an ejector provided in the supply passage and a control unit configured to pulsate the pressure of the anode gas supplied to the ejector. The ejector is configured to suck the anode gas discharged to the discharge passage and circulate the anode gas to the fuel cell by the anode gas supplied from the pressure control valve.

DESCRIPTION OF EMBODIMENTS

Hereinafter, embodiments of the present invention are described with reference to the drawings and the like.

(First Embodiment)

First, a fuel cell stack used in a fuel cell system in a first embodiment of the present invention is described.

A fuel cell stack is formed by laminating a plurality of fuel cells and, in the present embodiment, used as a power source for supplying power to an electric motor for driving a vehicle.

The fuel cell includes an anode electrode (so-called fuel electrode), a cathode electrode (so-called oxidant electrode) and an electrolyte membrane sandwiched between these electrodes.

In the fuel cell, anode gas (so-called fuel gas) containing hydrogen and supplied to the anode electrode and cathode gas (so-called oxidant gas) containing oxygen and supplied to the cathode electrode induce an electrochemical reaction to generate power. The electrochemical reaction (power generation reaction) of the fuel cell proceeds in the anode and cathode electrodes as follows.

Anode electrode: $2H_2 \rightarrow 4H^+ + 4e^-$ (1)

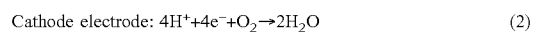

Cathode electrode: $4H^+ + 4e^- + O_2 \rightarrow 2H_2O$ (2)

Figure 1:
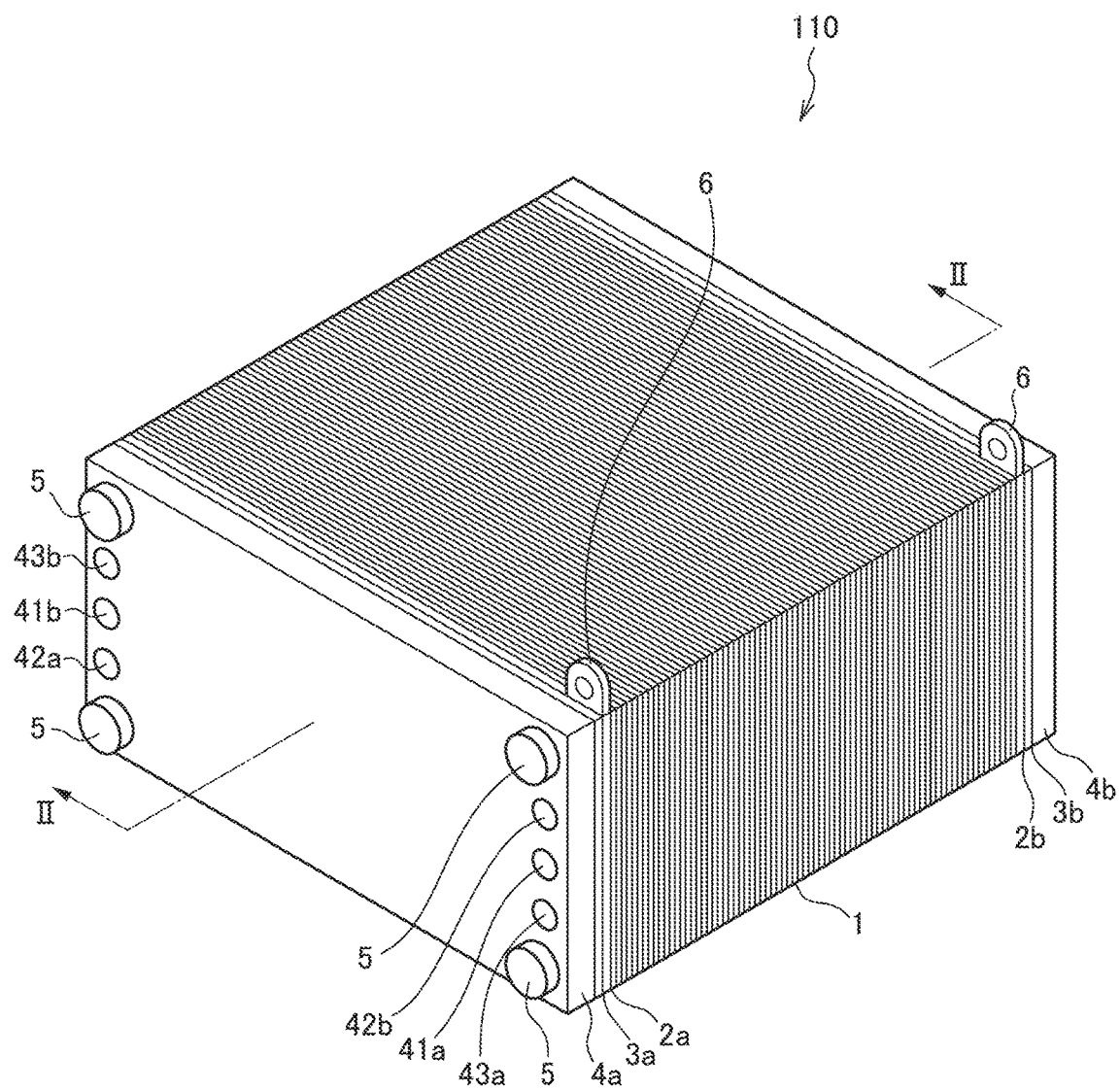
FIG. 1 is a perspective view of a fuel cell stack in a first embodiment of the present invention.

FIG. 1 is a perspective view showing an example of a fuel cell stack 110 in the present embodiment.

The fuel cell stack 110 includes a plurality of unit cells 1, a pair of current collector plates 2a and 2b a pair of insulation plates 3a and 3b, a pair of end plates 4a and 4b and nuts 5 to be threadably engaged with unillustrated four tension rods.

The unit cell 1 is a solid polymer type fuel cell. The unit cell 1 generates an electromotive voltage of about 1 volt. The structure of the unit cell 1 is described later with reference to FIG. 2.

The pair of current collector plates 2a and 2b are respectively arranged at outer sides of the plurality of laminated unit cells 1. The current collector plates 2a and 2b are formed of a gas impermeable conductive material. The gas impermeable conductive material is, for example, dense carbon. The current collector plate 2a, 2b includes an output terminal 6 on a part of an upper side. In the fuel cell stack 110, electrons e⁻ generated in each unit cell 1 are extracted from the output terminals 6.

The pair of insulation plates 3a and 3b are respectively arranged at outer sides of the current collector plates 2a and 2b. The insulation plates 3a and 3b are formed of an insulating material such as rubber.

The pair of end plates 4a and 4b are respectively arranged at outer sides of the insulation plates 3a and 3b. The end plates 4a and 4b are formed of a rigid metallic material such as steel.

One end plate 4a out of the pair of end plates 4a and 4b is formed with a cooling water inlet hole 41a and a cooling water outlet hole 41b, an anode gas inlet hole 42a and an anode gas outlet hole 42b and a cathode gas inlet hole 43a and a cathode gas outlet hole 43b. It should be noted that the cooling water inlet hole 41a, the anode gas outlet hole 42b and the cathode gas inlet hole 43a are formed on one end side (right side in FIG. 1) of the end plate 4a and the cooling water outlet hole 41b, the anode gas inlet hole 42a and the cathode gas outlet hole 43b are formed on the other end side (left side in FIG. 1).

Here, a method for directly supplying hydrogen gas from a hydrogen storage device or a method for supplying hydrogen-containing gas obtained by modifying hydrogen-containing fuel is, for example, adopted as a method for supplying hydrogen to the anode gas inlet hole 42a. It should be noted that the hydrogen storage device is a high-pressure gas tank, a liquefied hydrogen tank, a hydrogen storage alloy tank or the like. The fuel gas is thought to be natural gas, methanol, gasoline or the like. Further, air is generally used as oxidant gas.

The nuts 5 are threadably engaged with externally threaded parts formed on both end parts of the four tension rods penetrating inside the fuel cell stack 110. By threadably fastening the nuts 5 to the tension rods, the fuel cell stack 110 is tightened in a lamination direction. The tension rods are formed of a rigid metal material such as steel. An insulation processing is applied to the surfaces of the tension rods to prevent an electrical short circuit between the unit cells 1.

Figure 2:
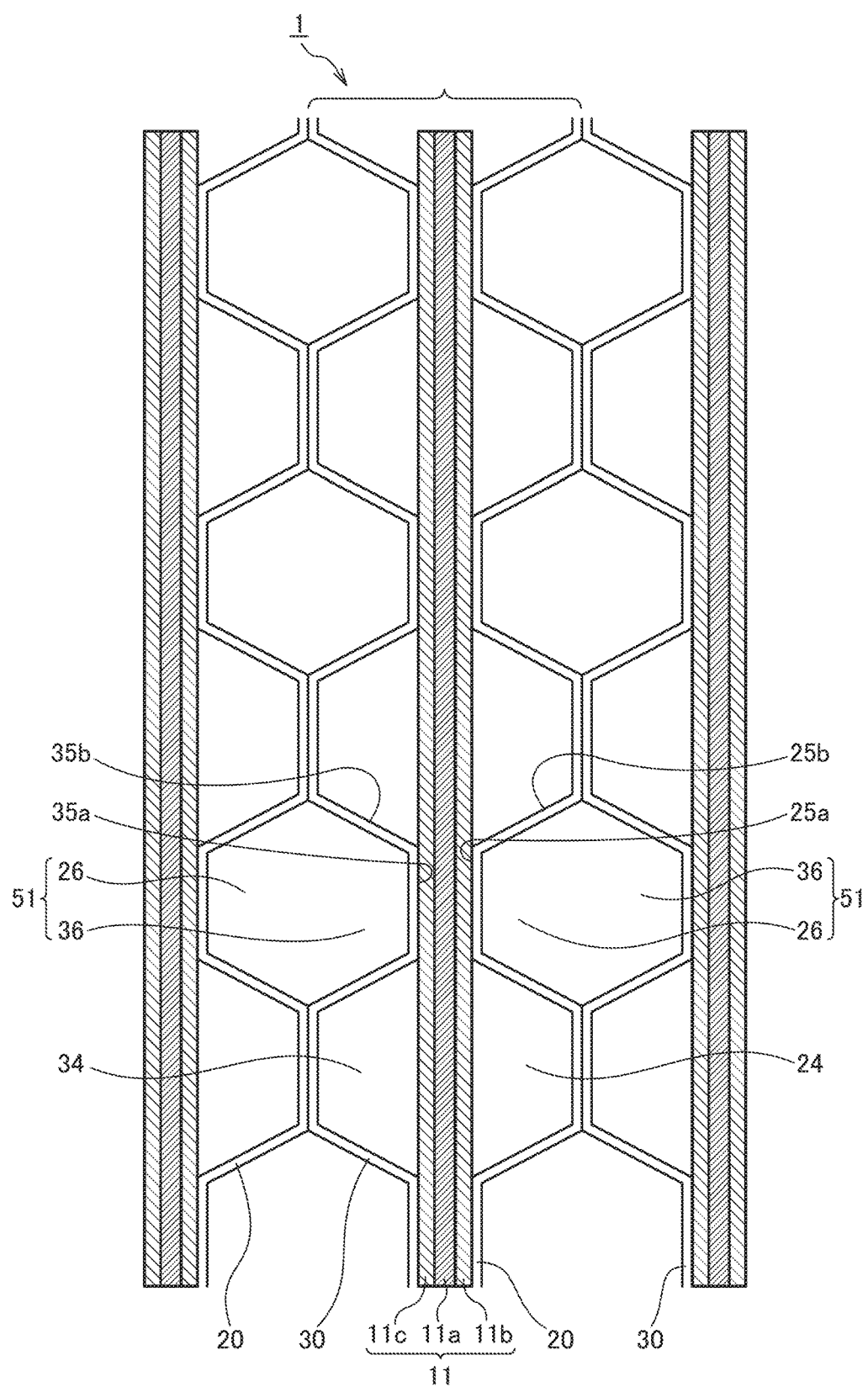
FIG. 2 is a sectional view showing fuel cells laminated in the fuel cell stack.

FIG. 2 is a diagram showing cross-sections of the unit cells 1 viewed in a direction along line II-II of FIG. 1.

The unit cell 1 is configured by sandwiching a membrane electrode assembly (hereinafter, referred to as an "MEA") 11 by an anode separator 20 and a cathode separator 30.

The MEA 11 includes an electrolyte membrane 11a, an anode electrode 11b and a cathode electrode 11c. The MEA 11 includes the anode electrode 11b on one surface of the electrolyte membrane 11a and the cathode electrode 11c on the other surface.

The electrolyte membrane 11a is a proton conductive ion exchange membrane formed of fluorine-based resin. The electrolyte membrane 11a exhibits good electrical conductivity in a wet state containing water.

The anode electrode 11b and the cathode electrode 11c are composed of a gas diffusion layer, a water-repellent layer and a catalyst layer. The gas diffusion layer is formed of a material having sufficient gas diffusion property and electroconductivity such as carbon cloth formed by weaving threads made of carbon fiber. The water-repellent layer is a layer containing polyethylene fluoroethylene and a carbon material. The catalyst layer is formed by carbon black particles carrying platinum.

The anode separator 20 is in contact with the anode electrode 11b. The anode separator 20 includes anode gas flow passages 24 for supplying the anode gas to the anode electrode 11b on a side in contact with the anode electrode 11b. Cooling water flow passages 26 in which cooling water for cooling the fuel cell stack 110 flows are provided on surfaces opposite to surfaces (top surfaces of flow passage ribs 25 to be described later) 25a directly in contact with the anode electrode 11b.

Similarly, the cathode separator 30 includes cathode gas flow passages 34 for supplying the cathode gas to the cathode electrode 1 lb on a side in contact with the cathode electrode 11c and cooling water flow passages 36 on surfaces opposite to surfaces (top surfaces of flow passage ribs 35 to be described later) 35a directly in contact with the cathode electrode 11c. The anode separator 20 and the cathode separator 30 are made of metal or carbon.

It should be noted that the cooling water flow passage 26 of the anode separator 20 and the cooling water flow passage 36 of the cathode separator 30 are formed to face each other, thereby forming one cooling water flow passage 51.

Further, the anode gas flowing in the anode gas flow passages 24 and the cathode gas flowing in the cathode gas flow passages 34 flow together in opposite directions via the MEA 11. In the present embodiment, the anode gas flowing in the anode gas flow passages 24 flows from a back side to a front side of the plane of FIG. 2 and the cathode gas flowing in the cathode gas flow passages 34 flows from the front side to the back side of the plane of FIG. 2.

Figure 3A:
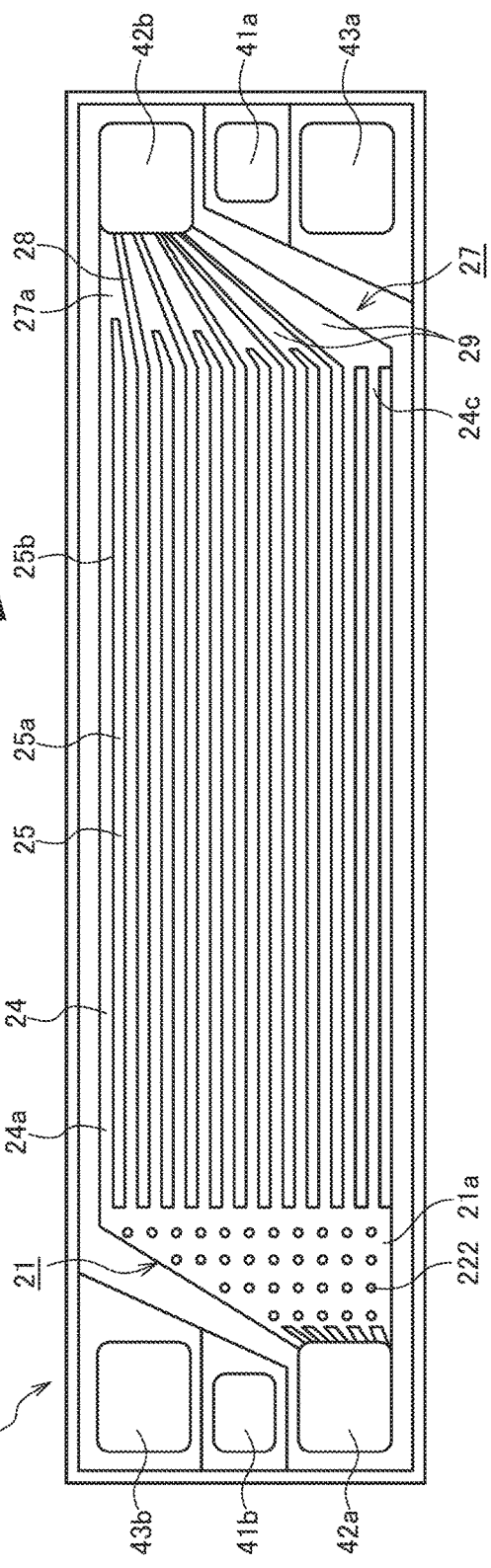
FIG. 3A is a plan view showing an anode separator constituting the fuel cell.

FIG. 3A is a plan view of the anode separator 20 viewed from an anode electrode side.

The cathode gas outlet hole 43b, the cooling water outlet hole 41b and the anode gas inlet hole 42a are formed in this order from top on one end (left end in FIG. 3A) of the anode separator 20. On the other hand, the anode gas outlet hole 42b, the cooling water inlet hole 41a and the cathode gas inlet hole 43a are formed in this order from top on the other end (right end in FIG. 3A) of the anode separator 20.

Further, an anode gas diffusing part 21, a plurality of groove-like anode gas flow passages 24 and an anode gas merging part 27 are formed on a surface of the anode separator 20.

The anode gas flow passages 24 are flow passages projecting from gas flow passage bottom surfaces 24a toward the anode electrode side and formed between a plurality of flow passage ribs 25 in contact with the anode electrode. It should be noted that the back surfaces of the flow passage ribs 25 serve as the cooling water flow passages 26 described above. Side surfaces 25b of the flow passage rib 25 are tapered and inclined at a fixed angle from the flow passage rib top surface 25a toward the gas flow passage bottom surface 24a. In this way, an extra turbulent flow of the gas flowing in the anode gas flow passage 24 is suppressed, wherefore a pressure loss is reduced.

The anode gas diffusing part 21 is formed between the anode gas inlet hole 42a and the anode gas flow passages 24. The anode gas diffusing part 21 is formed with a plurality of projection-like diffusion ribs 222 projecting from an anode gas diffusing part bottom surface 21a toward the anode electrode and in contact with the anode electrode in a lattice manner to equally distribute the anode gas to each anode gas flow passage 24.

The anode gas merging part 27 is formed between the anode gas flow passages 24 and the anode gas outlet hole 42b. The anode gas merging part 27 is a gas flow passage narrowed in width from the anode gas flow passages 24 toward the anode gas outlet hole 42b.

The anode gas merging part 27 is formed with a plurality of merging ribs 28 projecting from an anode gas merging part bottom surface 27a toward the anode electrode and in contact with the anode electrode. The anode gas merging part 27 is divided into a plurality of areas (gas merging flow passages) 29 by these merging ribs 28.

The merging ribs 28 are formed from gas flow passage ends 24c toward the anode gas outlet hole 42b. The merging ribs 28 are formed such that the gas merging flow passages 29 become narrower in width toward the anode gas outlet hole 42b. The merging ribs 28 are formed such that a flow rate of the gas flowing into each gas merging flow passage 29 from the anode gas flow passage 24 is substantially equal. The number of the merging ribs 28 is smaller than that of the flow passage ribs 25. It should be noted that ends of some flow passage ribs 25 are extended until flow passage widths of adjacent gas merging flow passages 29 become substantially equal to a flow passage width of the anode gas flow passages 24.

Figure 3B:
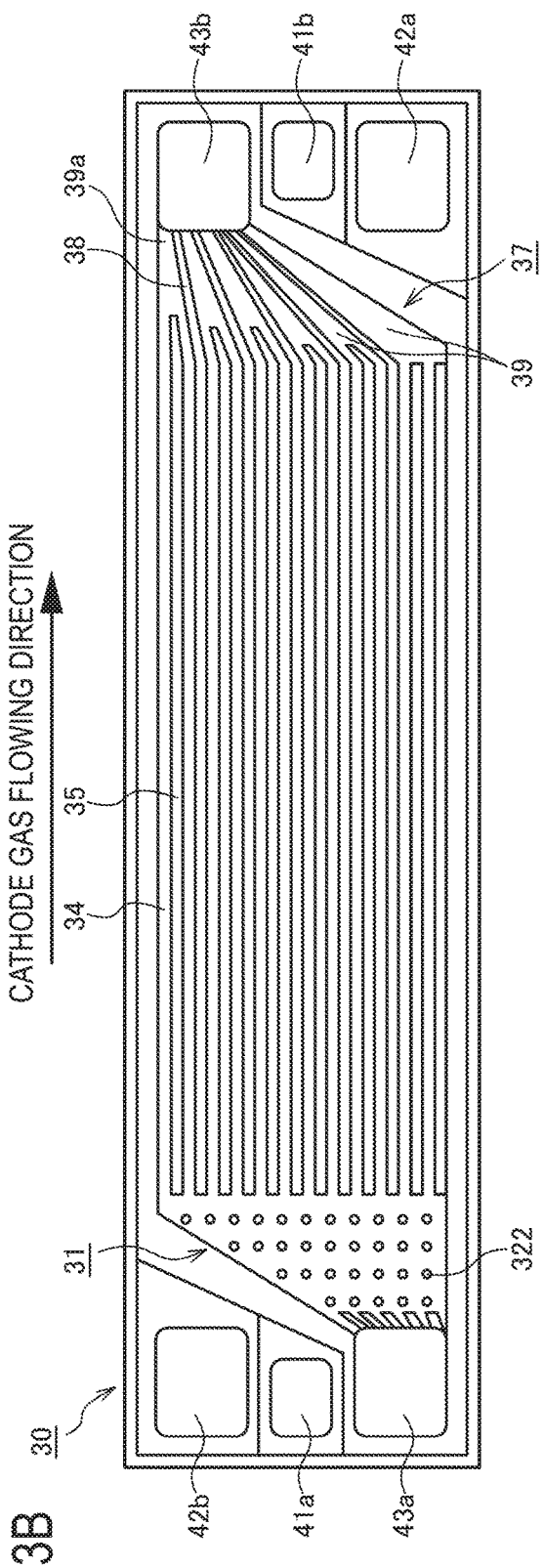
FIG. 3B is a plan view showing a cathode separator constituting the fuel cell.

FIG. 3B is a plan view of the cathode separator 30 viewed from the side of the cathode electrode 11c.

The cathode separator 30 is similarly configured to the anode separator 20. The cathode separator 30 includes a cathode gas diffusing part 31, the cathode gas flow passages 34, the flow passage ribs 35 and a cathode gas merging part 37.

The cathode gas diffusing part 31 is formed with diffusion ribs 322. Merging ribs 38 are provided and gas merging flow paths 39 are formed in the cathode gas merging part 37.

Since the cathode separator 30 is facing the anode separator 20 via the MEA 11, one end side (left side of FIG. 3B) of the cathode separator 30 is the other end side (right side of FIG. 3A) of the anode separator 20. The other end side (right side of FIG. 3B) of the cathode separator 30 is the one end side (left side of FIG. 3A) of the anode separator 20.

Thus, the anode gas outlet hole 42b, the cooling water inlet hole 41a and the cathode gas inlet hole 43a same as three holes formed on the other end side of the anode separator 20 are formed on the one end side (left side of FIG. 3B) of the cathode separator 30. The cathode gas outlet hole 43b, the cooling water outlet hole 41b and the anode gas inlet hole 42a same as three holes formed on the one end side of the anode separator 20 are formed on the other end side (right side of FIG. 3B) of the cathode separator 30.

Figure 4:
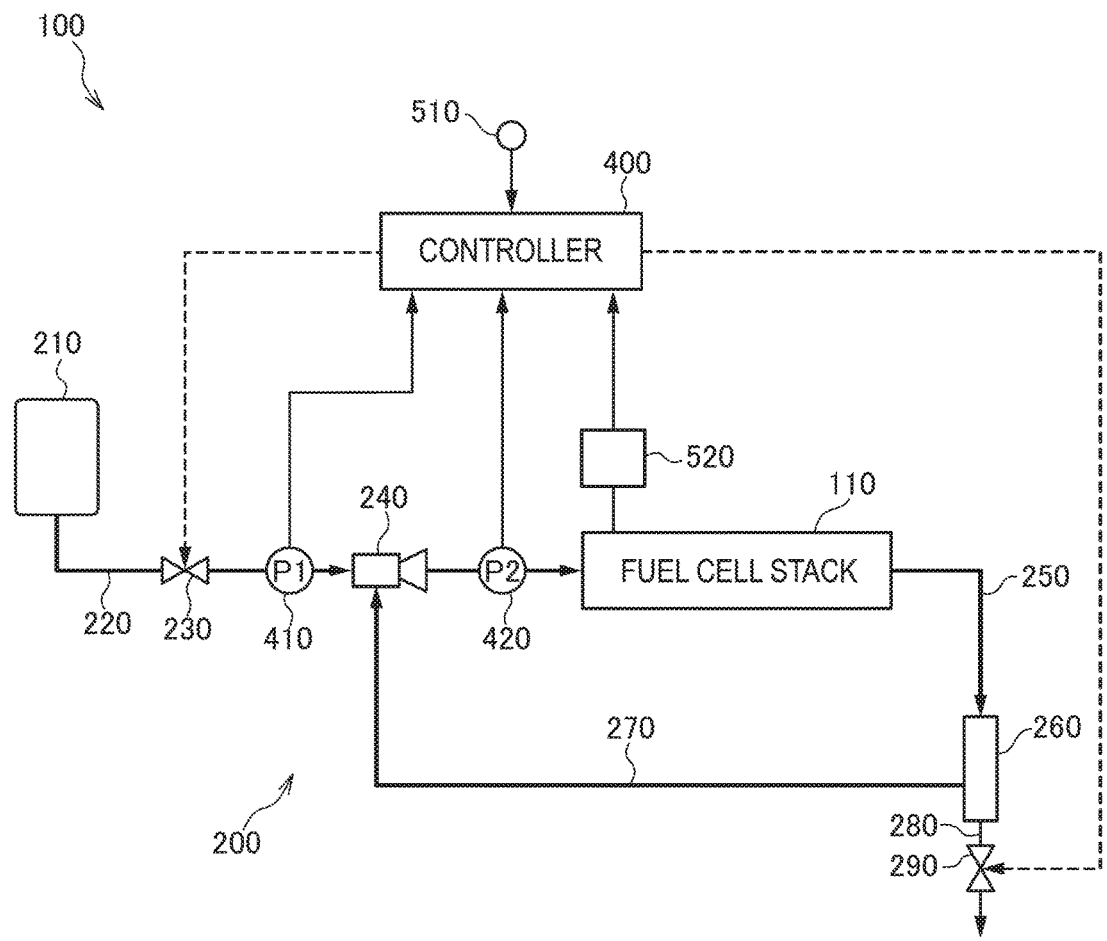
FIG. 4 is a diagram showing a main configuration of a fuel cell system.

FIG. 4 is a schematic diagram showing the configuration of the fuel cell system 100 in the first embodiment of the present invention.

The fuel cell system 100 supplies the anode gas and the cathode gas to the fuel cell stack 110 and causes the fuel cell stack 110 to generate power according to a load.

The fuel cell system 100 is an anode gas circulation-type fuel cell system. The fuel cell system 100 includes the fuel cell stack 110, an anode gas supplying/discharging device 200 and a controller 400. It should be noted that a cathode gas supplying device for supplying the cathode gas to the cathode gas inlet hole 43a of the fuel cell stack 110 and a cooling device for supplying the cooling water to the inlet hole 41a of the fuel cell stack 110 shown in FIG. 1 are not shown for convenience since they are not main parts of the present embodiment.

The fuel cell stack 110 receives the supply of the anode gas and the cathode gas and generates power according to a load connected to the fuel cell stack 110. The load is, for example, an electric motor mounted in the vehicle, an auxiliary machine for assisting the power generation of the fuel cell stack 110 or the like. Examples of the auxiliary machine include a compressor for supplying the cathode gas to the fuel cell stack 110.

Since the plurality of laminated unit cells 1 are connected to each other in series in the fuel cell stack 110, a sum of cell voltages generated in each unit cell 1 is an output voltage to the load.

The anode gas supplying/discharging device 200 includes a high-pressure tank 210, an anode gas supply passage 220, an anode pressure control valve 230, an ejector 240, an anode gas discharge passage 250, a buffer tank 260, a circulation passage 270, a purge passage 280 and a purge valve 290. Further, the anode gas supplying/discharging device 200 includes a first pressure sensor 410 and a second pressure sensor 420.

The high-pressure tank 210 stores the anode gas to be supplied to the fuel cell stack 110 in a high-pressure state.

The anode gas supply passage 220 is a passage used to supply the anode gas flowing out from the high-pressure tank 210 to the fuel cell stack 110. One end part of the anode gas supply passage 220 is connected to the high-pressure tank 210 and the other end part is connected to the anode gas inlet hole 42a of the fuel cell stack 110 shown in FIG. 1.

The anode pressure control valve 230 is provided in the anode gas supply passage 220. The anode pressure control valve 230 supplies the anode gas pushed out from the high-pressure tank 210 to the fuel cell stack 110 while adjusting the anode gas to a desired pressure.

The anode pressure control valve 230 is an electromagnetic valve whose opening is adjustable continuously or stepwise. The opening of the anode pressure control valve 230 is controlled by the controller 400. As the opening of the anode pressure control valve 230 increases, the anode pressure control valve 230 is opened and a pressure P2 of the anode gas supplied to the fuel cell stack 110 increases.

The first pressure sensor 410 is provided between the anode pressure control valve 230 and the ejector 240 in the anode gas supply passage 220. The first pressure sensor 410 detects a supply pressure P1 of the anode gas supplied to the ejector 240 from the anode pressure control valve 230. A detection signal indicating the supply pressure P1 is output from the first pressure sensor 410 to the controller 400.

The ejector 240 is provided in a part of the anode gas supply passage 220 downstream of the anode pressure control valve 230 where the circulation passage 270 joins. The ejector 240 is a mechanical pump for sucking the anode gas from the circulation passage 270 and circulating the anode gas to the fuel cell stack 110 while supplying the anode gas supplied from the anode pressure control valve 230 at a supply flow rate to the fuel cell stack 110. The ejector 240 is described in detail with reference to FIGS. 5A and 5B.

The second pressure sensor 420 is provided downstream of the ejector 240 and near the fuel cell stack 110 in the anode gas supply passage 220. The second pressure sensor 420 detects the pressure P2 of the anode gas supplied to the fuel cell stack 110. A detection signal indicating the pressure P2 is output from the second pressure sensor 420 to the controller 400. The pressure P2 is used as a pressure in the anode gas flow passages 24 shown in FIG. 3A.

The anode gas discharge passage 250 is a passage for discharging the anode gas from the anode gas outlet hole 42b of the fuel cell stack 110 shown in FIG. 1. Anode off-gas is discharged to the anode gas discharge passage 250 from the fuel cell stack 110.

The anode off-gas is mixture gas of excess anode gas not used in the power generation reaction of the fuel cell stack

110 and impurity gas. Further, the impurity gas is inert gas such as steam and nitrogen gas cross-leaked (permeated) to the anode gas flow passages 24 via the MEAs 11 from the cathode gas flow passages 34.

The buffer tank 260 temporarily stores the anode off-gas flowing from the fuel cell stack 110 through the anode gas discharge passage 250. Part of steam in the anode off-gas is condensed in the buffer tank 260 to become liquid water and separated from the anode off-gas.

The purge passage 280 is a passage for discharging the anode off-gas containing nitrogen gas and liquid water accumulated in the buffer tank 260. One end part of the purge passage 280 is connected to a downstream side of the buffer tank 260 and the other end part is open.

The purge valve 290 is provided in the purge passage 280. The purge valve 290 discharges the anode off-gas and the liquid water pooled in the buffer tank 260 to outside via the purge passage 280. The purge valve 290 is an electromagnetic valve whose opening is adjustable continuously or stepwise. The opening of the purge valve 290 is controlled by the controller 400. The opening of the purge valve 290 is adjusted such that a hydrogen concentration in the anode off-gas is not higher than a specified value.

The circulation passage 270 is a passage for causing the anode off-gas flowing out from the buffer tank 260 to join the anode gas supply passage 220. One end part of the circulation passage 270 is connected to the buffer tank 260 and the other end part is connected to a suction port of the ejector 240.

The controller 400 is configured by a microcomputer including a central processing unit (CPU), a read-only memory (ROM), a random access memory (RAM) and an input/output interface (I/O interface).

To the controller 400 are input signals and the like of various sensors for detecting an operating state of the fuel cell system 100, an operating state of the load connected to the fuel cell stack 110 and the like besides signals from the first and second pressure sensors 410, 420 described above.

Various sensors include an accelerator stroke sensor 510 for detecting a depressed amount of an accelerator pedal and an internal resistance measuring device 520 for measuring an internal resistance of the fuel cell stack 110 correlated with a wet/dry state of the fuel cells. Besides, the various sensors include a temperature sensor for detecting a temperature of the cooling water for cooling the fuel cell stack 110 and the like.

The controller 400 controls the operating state of the fuel cell stack 110 on the basis of signals input from the various sensors and the like described above, command signals to the components of the fuel cell system 100 and the like.

For example, the controller 400 calculates required power required from the electric motor to the fuel cell stack 110, i.e. a required load on the basis of the depressed amount output from the accelerator stroke sensor 510.

The controller 400 increases a flow rate of the cathode gas supplied to the fuel cell stack 110 as the required load increases. Together with this, the controller 400 increases the pressure of the anode gas supplied to the fuel cell stack 110 by increasing the opening of the anode pressure control valve 230 as the required load increases.

Further, the controller 400 limits the control of the pressure and flow rate of the cathode gas and the control of the pressure and flow rate of the anode gas according to a temperature state, a wet/dry state, an internal pressure state, a steam partial pressure state and a discharged hydrogen diluted state and the like of the fuel cell stack 110.

Figure 5A:
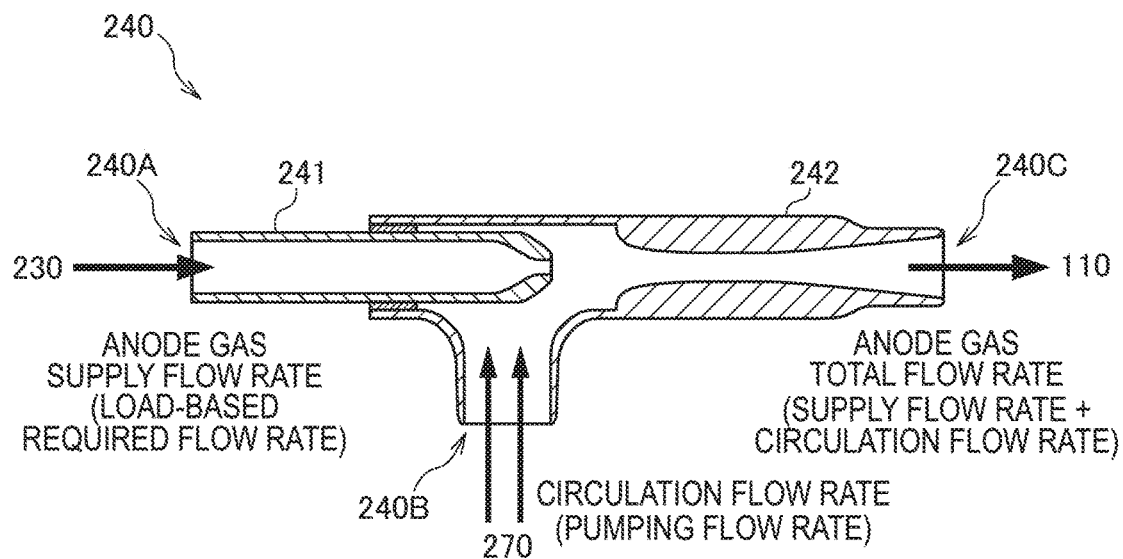
FIG. 5A is a sectional view showing the configuration of an ejector provided in the fuel cell system.

FIG. 5A is a sectional view showing a detailed configuration of the ejector 240 in the present embodiment.

The ejector 240 is composed of a nozzle 241 and a diffuser 242.

The nozzle 241 accelerates a flow velocity of the anode gas supplied to a supply port 240A from the pressure control valve 230 and injects the anode gas to the diffuser 242. A supply flow rate of the anode gas supplied to the nozzle 241 is calculated on the basis of the required load and corresponds to an amount of the anode gas consumed as power is generated by the fuel cell stack 110.

The nozzle 241 is formed into a cylindrical shape. An opening narrower than the supply port 240A is formed in a tip part of the nozzle 241. Since the flow velocity of the anode gas supplied to the supply port 240A is increased at the tip part in this way, the anode gas is injected to the diffuser 242 at the tip part.

The diffuser 242 sucks the anode off-gas from the circulation passage 270 by the flow velocity of the anode gas injected from the nozzle 241 to circulate the anode off-gas to the fuel cell stack 110. Then, the diffuser 242 discharges the sucked anode off-gas and the anode gas injected from the nozzle 241 at an anode gas total flow rate obtained by adding a circulation flow rate of the sucked anode off-gas and the supply flow rate of the anode gas injected from the nozzle 241 to the fuel cell stack 110 from a discharge port 240C.

The diffuser 242 is formed with a merging passage on the same axis as the nozzle 241. An opening of the merging passage is formed to be wider toward the discharge port 240C. The diffuser 242 is formed with a cylindrical suction chamber extending from a suction port 240B to the tip part of the nozzle 241 and the suction chamber and the merging passage communicate.

Figure 5B:
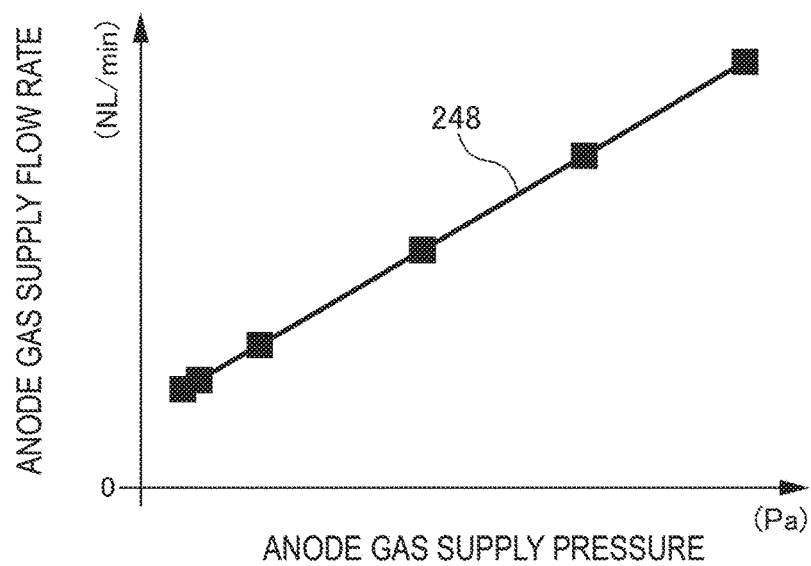
FIG. 5B is a graph showing a characteristic of a supply flow rate of anode gas supplied to the ejector according to a pressure of the anode gas supplied from an anode pressure control valve.

FIG. 5B is a graph showing a characteristic 248 of the supply flow rate of the anode gas supplied to the ejector 240 according to the anode gas pressure adjusted by the anode pressure control valve 230.

Here, a horizontal axis represents a supply pressure of the anode gas supplied to the nozzle 241 from the anode pressure control valve 230 and a vertical axis represents a value obtained by converting the supply flow rate of the anode gas supplied to the nozzle 241 into an anode gas flow rate (NL/min) in a standard state.

As shown in FIG. 5B, the supply flow rate of the anode gas supplied to the nozzle 241 is proportional to the supply pressure of the anode gas supplied to the nozzle 241.

Thus, as the required power required from the load increases, the supply pressure of the anode gas supplied from the anode pressure control valve 230 increases. Therefore, the supply flow rate of the anode gas supplied to the nozzle 241 increases. In this way, the circulation flow rate of the anode off-gas sucked by the diffuser 242 increases.

As just described, excess anode gas can be reutilized by sucking the anode off-gas discharged from the fuel cell stack 110 and circulating the sucked anode off-gas to the fuel cell stack 110 using the ejector 240.

On the other hand, as the required power from the load decreases, the supply flow rate of the anode gas to the nozzle 241 decreases. Thus, a suction amount of the anode off-gas sucked by the diffuser 242 decreases and the anode off-gas is no longer circulated to the fuel cell stack 110.

As a countermeasure against this, in the present embodiment, the pressure of the anode gas supplied to the ejector 240 is pulsated so that the anode off-gas discharged from the fuel cell stack 110 is sufficiently circulated by the ejector 240.

In addition to this, the fuel cell stack 110 is humidified, utilizing steam contained in the anode off-gas in the present embodiment.

Specifically, by sufficiently circulating the anode off-gas to the anode gas flow passages 24 shown in FIG. 3A by the ejector 240, a humidity in the anode gas flow passages 24 increases as a whole and a difference from a humidity in the cathode gas flow passages 34 on an upstream side where dry cathode gas flows becomes larger. This relative humidity difference becomes a driving force and steam in the anode gas flow passages 24 is diffused into the cathode gas flow passages 34 via the MEAs 11 to humidify the electrolyte membranes 11a of the MEAs 11. In this way, power is efficiently generated in the electrolyte membranes 11a.

Figure 6:
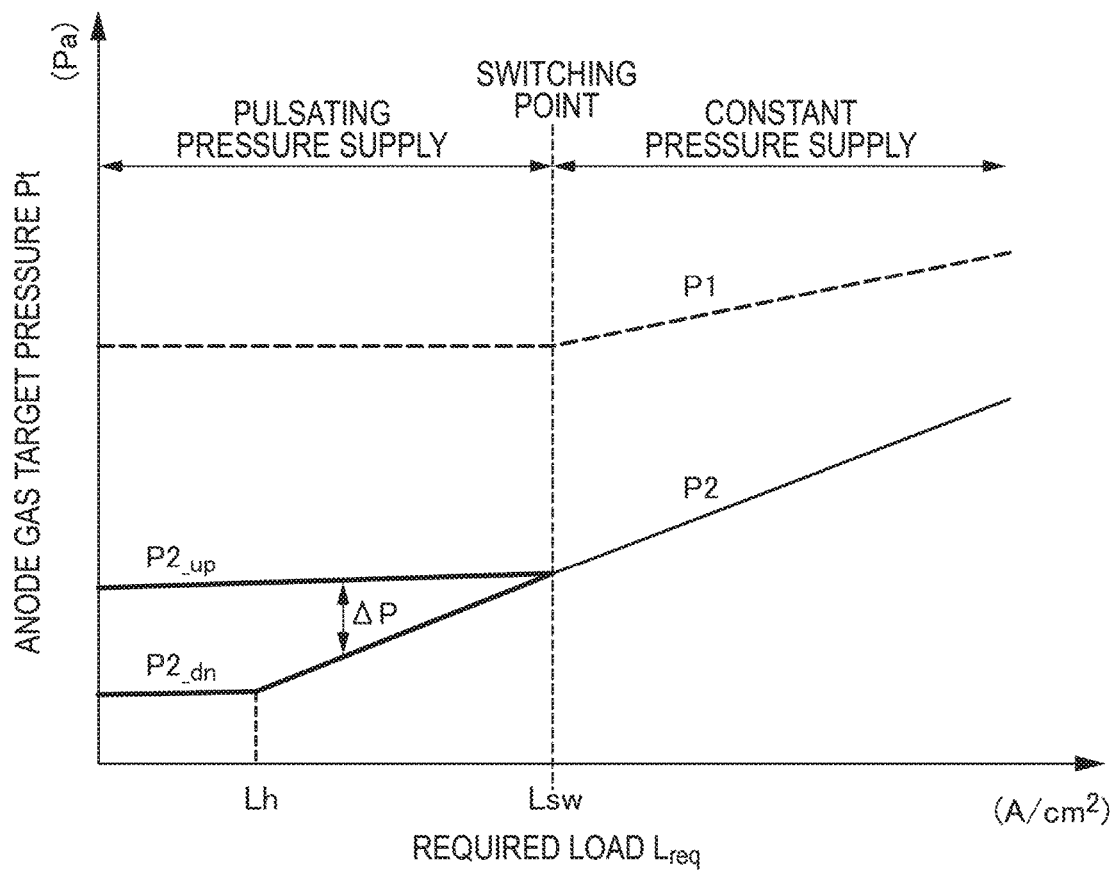
FIG. 6 is a graph showing a pulsation control map determined to pulsate the anode gas pressure.

FIG. 6 is a conceptual diagram showing an example of a pulsation control map determined to pulsate the anode gas pressure. The pulsation control map is stored in advance in the controller 400.

A target value of the pressure P2 of the anode gas supplied to the fuel cell stack 110 from the ejector 240 is shown by a solid line in FIG. 6. Further, a maximum value of the supply pressure P1 of the anode gas supplied to the ejector 240 from the anode pressure control valve 230 is shown by a broken line as a reference.

Here, a horizontal axis represents a required load Lreq to the fuel cell stack 110 and a vertical axis represents a target pressure Pt of the anode gas. The required load Lreq is calculated on the basis of required power required to the fuel cell stack 110 from the electric motor.

A switching point Lsw is a threshold value for switching between pulsating pressure supply for pulsating the pressure P2 of the anode gas supplied to the fuel cell stack 110 and constant pressure supply for making the pressure P2 of the anode gas supplied to the fuel cell stack 110 constant.

In a high load region where the required load Lreq is higher than the switching point Lsw, one target pressure Pt of the anode gas is set for each required load. In this way, a constant pressure control of controlling the anode pressure control valve 230 such that the pressure of the anode gas becomes constant is executed.

In the high load region, the anode gas pressure P2 increases in proportion to the required load Lreq. Thus, the anode gas pressure P2 increases as the required load Lreq increases.

The reason for this is to prevent the following. Since the pressure of the cathode gas supplied to the fuel cell stack 110 increases as the required load Lreq increases, an interelectrode differential pressure between the cathode gas pressure and the anode gas pressure in the fuel cell stack becomes excessive and the MEAs 11 are damaged. Thus, the anode gas pressure P2 is determined to increase with an increase of the cathode gas pressure as the required load Lreq increases.

In a low load region where the required load Lreq is lower than the switching point Lsw, two target pressures Pt, i.e. a pulsation upper limit pressure P2_up and a pulsation lower limit pressure P2_dn are determined. In this way, a pulsating pressure control of controlling the anode pressure control valve 230 such that the pressure of the anode gas pulsates is executed.

The pulsation upper limit pressure P2_up is a target value of an upper limit pressure determined to pulsate the pressure of the anode gas.

The pulsation upper limit pressure P2_up is a substantially constant value. As the required load Lreq increases, a consumption amount of the anode gas in the fuel cell stack 110 increases. Thus, the pulsation upper limit pressure P2_up gradually increases. The pulsation upper limit pressure P2_up is determined to be an anode gas pressure capable of sufficiently ensuring the circulation flow rate of the anode off-gas circulated by the ejector 240. In the present embodiment, the pulsation upper limit pressure P2_up is set such that the circulation flow rate of the anode off-gas becomes a flow rate necessary to humidify the fuel cells.

The pulsation upper limit pressure P2_up is, for example, set such that a flow rate ratio of the circulation flow rate of the anode off-gas to the supply flow rate of the anode gas supplied to the nozzle 241 is 30%. Specifically, the pulsation upper limit pressure P2_up is set such that the circulation flow rate of the anode off-gas is 30% of the flow rate of the anode gas consumed in the fuel cell stack 110. It should be noted that the flow rate ratio is obtained by dividing the circulation flow rate of the anode off-gas by the supply flow rate of the anode gas.

The pulsation lower limit pressure P2_dn is a target value of a lower limit pressure determined to pulsate the pressure of the anode gas.

In a water production range where the required load Lreq is from zero (0) to a load Lh, the pulsation lower limit pressure P2_dn is a substantially constant value. As the required load Lreq increases, the pulsation lower limit pressure P2_dn slightly increases.

The pulsation lower limit pressure P2_dn is determined to be an anode gas pressure minimum necessary to contain an amount of steam in the anode off-gas necessary to humidify the fuel cell stack 110.

It should be noted that a saturated steam amount increases and the amount of steam contained in the anode off-gas increases as the temperature of the fuel cell stack 110 increases. Thus, the controller 400 may increase the pulsation lower limit pressure P2_dn as the temperature of the fuel cell stack 110 or the cooling water temperature of the fuel cell stack 110 increases in the water production range.

In a pulsation width suppression range where the required load Lreq is from the load Lh to the switching point Lsw, the pulsation lower limit pressure P2_dn is determined to increase as the required load Lreq increases. The reason for this is that the flow rate of the anode gas supplied to the fuel cell stack 110 needs to be increased as the required load Lreq increases.

Although the pulsation control map for setting the target pressure Pt of the anode gas according to the required load Lreq is described in FIG. 6, a parameter correlated with the required load Lreq may be used instead of the required load Lreq. The parameter correlated with the required load Lreq is, for example, the supply flow rate (required flow rate) of the anode gas calculated on the basis of the required load Lreq.

Figure 7:
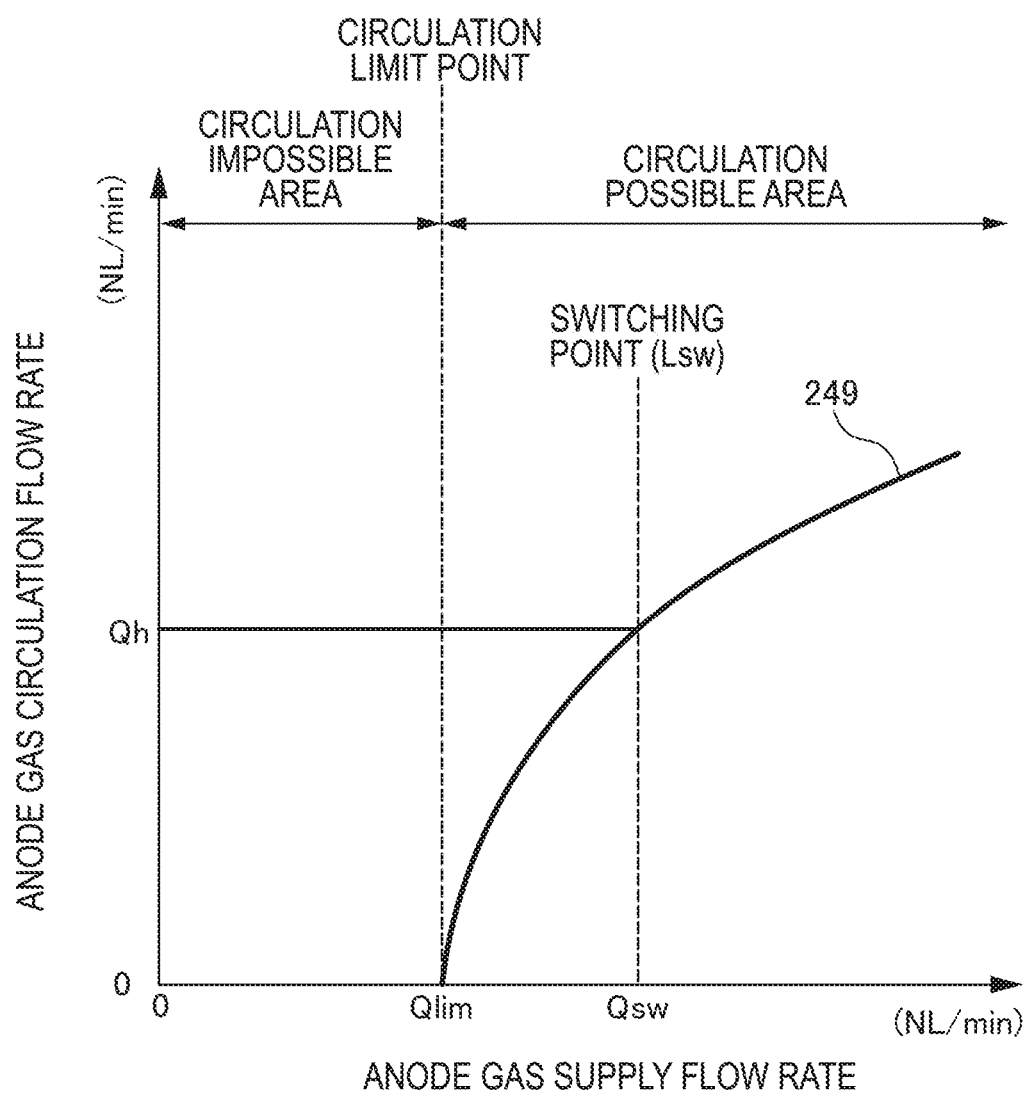
FIG. 7 is a graph showing a method for determining a switching point of the pulsation control map, FIG. 8 are charts showing the supply flow rate of the anode gas supplied to the ejector from the anode pressure control valve on the basis of a required load, FIG. 9 are charts illustrating waveforms of the anode gas pressure in a low load region and a high load region.

FIG. 7 is a graph showing a method for determining the switching point Lsw of the pulsation control map.

FIG. 7 shows a characteristic 249 of the circulation flow rate of the anode off-gas circulated to the fuel cell stack 110 from the ejector 240 according to the supply flow rate of the anode gas to the ejector 240. Here, a horizontal axis represents the supply flow rate of the anode gas supplied to the ejector 240 and a vertical axis represents the circulation flow rate of the anode off-gas discharged from the ejector 240.

In the characteristic 249 of the ejector 240, the circulation flow rate of the anode off-gas decreases as the supply flow rate of the anode gas decreases. When the supply flow rate of the anode gas is reduced to a circulation limit flow rate Qlim, the circulation flow rate of the anode off-gas becomes zero and the anode off-gas is no longer circulated to the fuel cell stack 110 from the ejector 240.

A humidification flow rate Qh is a circulation flow rate determined such that the amount of steam minimum necessary to humidify the fuel cells is supplied to the fuel cell stack 110 when the anode off-gas is circulated. The humidification flow rate Qh is set at such a value that the circulation flow rate of the anode off-gas is 30% of the supply flow rate of the anode gas.

Then, a pulsation switch flow rate Qsw is set such that the circulation flow rate of the anode off-gas becomes the humidification flow rate Qh. The switching point Lsw shown in FIG. 6 is determined by obtaining the required load Lreq when the supply flow rate of the anode gas becomes the pulsation switch flow rate Qsw.

Next, a pulsation control of pulsating the pressure of the anode gas is described with reference to FIGS. 8 and 9.

Figure 8:
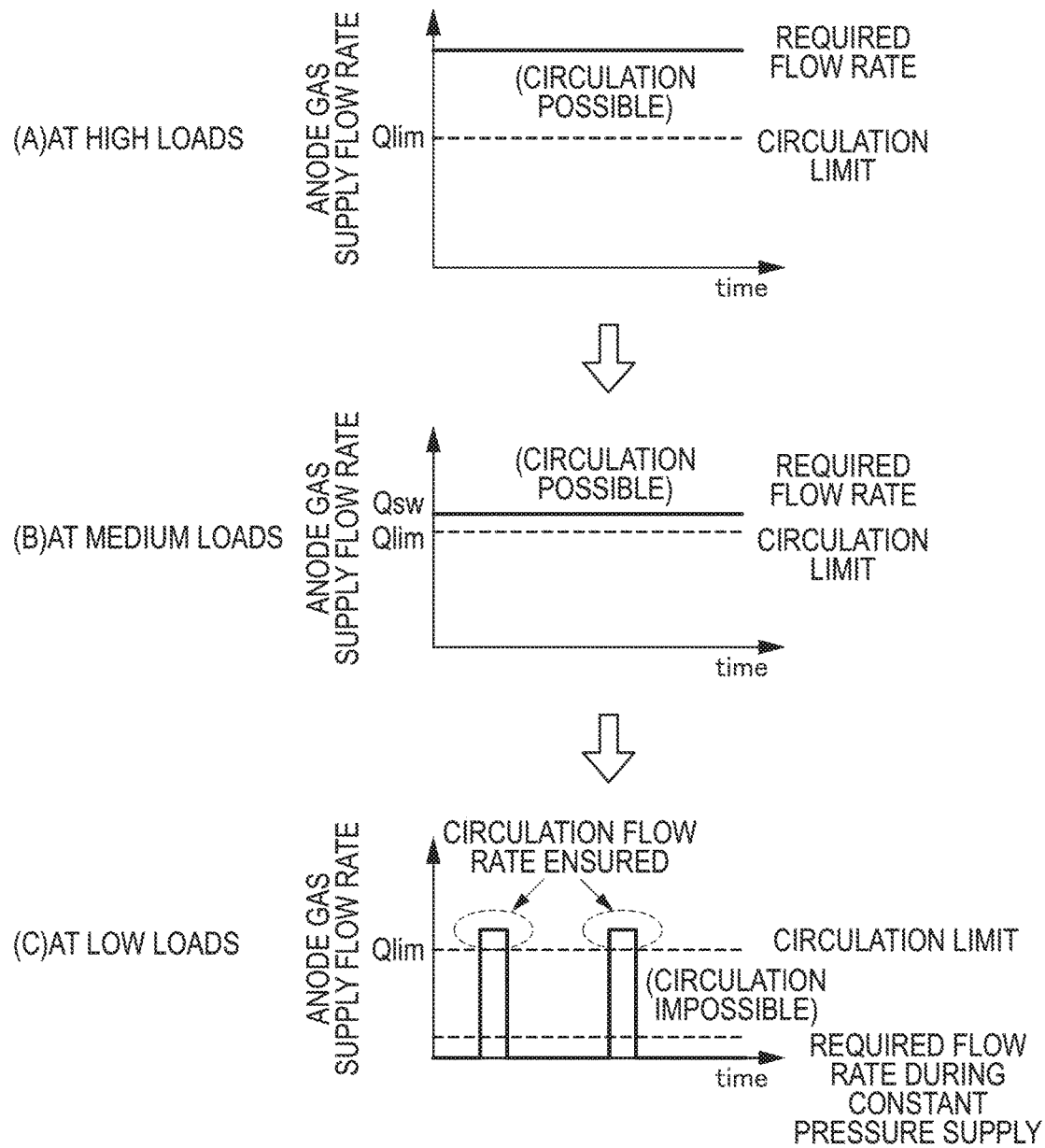

FIGS. 8 are charts showing the supply flow rate of the anode gas supplied from the anode pressure control valve 230 to the ejector 240 on the basis of the required load.

FIG. 8(A) is a chart showing the supply flow rate of the anode gas supplied from the anode pressure control valve 230 to the ejector 240 at high loads. Here, since a required flow rate of the anode gas is larger than the circulation limit flow rate Qlim, the constant pressure supply is performed to supply the anode gas such that the anode gas supply flow rate is adjusted to be constant by the anode pressure control valve 230. It should be noted that the required flow rate of the anode gas is calculated on the basis of the required load Lreq.

FIG. 8(B) is a chart showing the supply flow rate of the anode gas supplied from the anode pressure control valve 230 to the ejector 240 at medium loads. Here, since the required flow rate of the anode gas matches the pulsation switch flow rate Qsw, the constant pressure supply is performed by the anode pressure control valve 230 as in FIG. 8(A).

FIG. 8(C) is a chart showing the supply flow rate of the anode gas supplied from the anode pressure control valve 230 to the ejector 240 at low loads. Here, since the required flow rate of the anode gas is smaller than the circulation limit flow rate Qlim, the pulsating pressure supply is performed to supply the anode gas to the fuel cell stack 110 while pulsating the pressure of the anode gas by the anode pressure control valve 230. It should be noted that the pulsating pressure supply can also be called "pulsed supply" since the anode gas is supplied to the fuel cell stack 110 in a pulsed manner by controlling the opening and closing of the anode pressure control valve 230.

As shown in FIG. 8(C), in the pulsating pressure supply, the anode gas is supplied to the fuel cell stack 110 in a pulsed manner by opening the anode pressure control valve 230 for a fixed period so that an average flow rate of the anode gas supply flow rate becomes a required flow rate necessary for the power generation of the fuel cell stack 110. Further, the opening of the anode pressure control valve 230 is set at such a value that the anode gas supply flow rate is larger than the circulation limit flow rate Qlim.

In this way, the fuel cell stack 110 can be humidified by circulating the anode off-gas to the fuel cell stack 110 by the ejector 240 while supplying the anode gas to the fuel cell stack 110 at a flow rate necessary for power generation.

Figure 9:
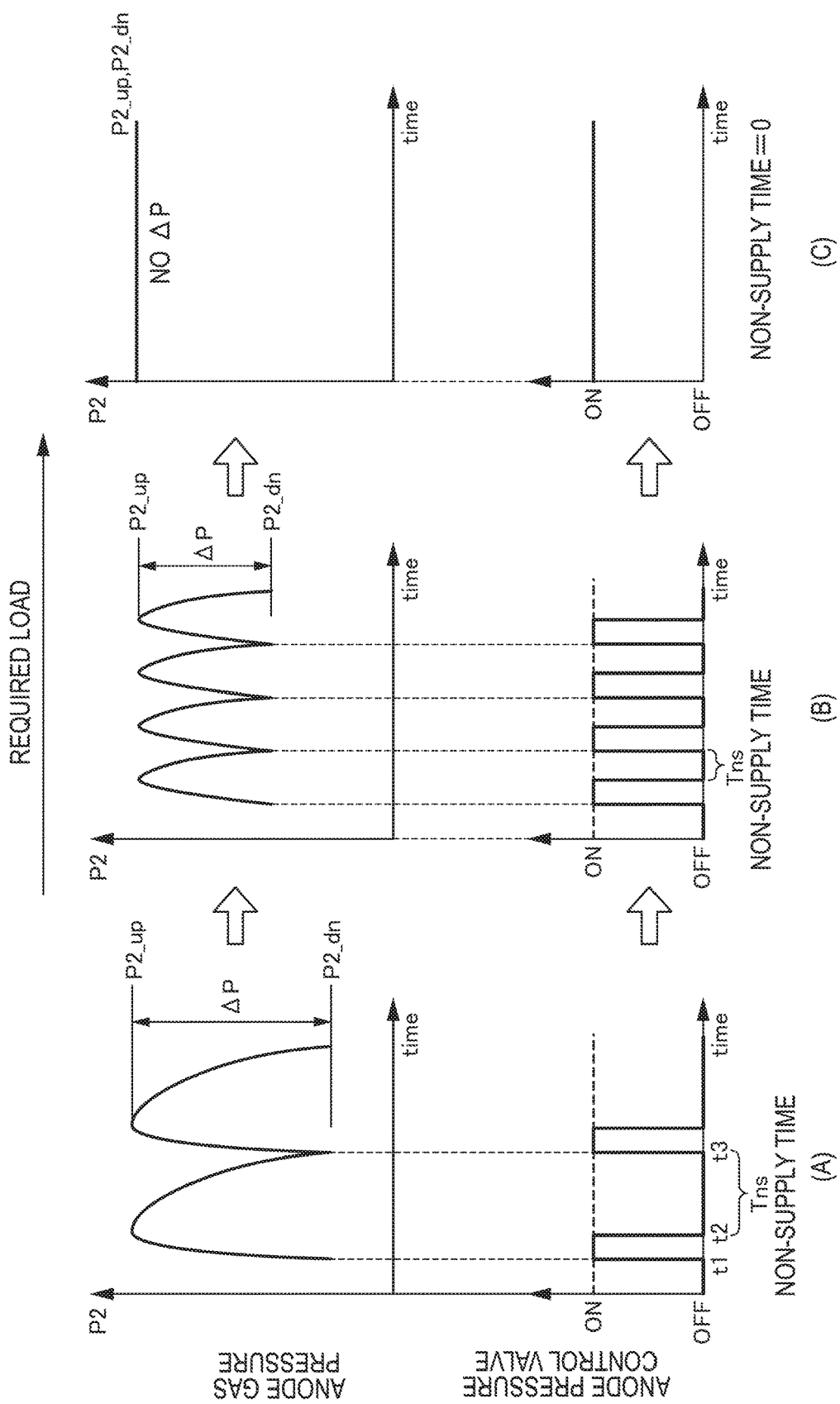

FIG. 9 are charts illustrating waveforms of the anode gas pressure in a low load region where the required load is lower than the switching point Lsw and a high load region where the required load is higher than the switching point Lsw.

FIG. 9(A) is a chart showing a pulsating waveform of the anode gas pressure when the required load is low in the low load region. In FIG. 9(A), the waveform of the anode gas pressure P2 and the open and closed states of the anode pressure control valve 230 are shown using a common time axis.

At time t1, the anode pressure control valve 230 is set to be fully open (ON). Since the anode gas is supplied to the fuel cell stack 110 from the anode pressure control valve 230 via the ejector 240 in this way, the pressure P2 of the anode gas supplied to the fuel cell stack 110 increases.

At this time, the anode gas is excessively supplied to the fuel cell stack 110 at a flow rate larger than that necessary for power generation in order to suck the anode off-gas by the ejector 240. Further, since the required load Lreq is low and the consumption amount of the anode gas consumed by the fuel cell stack 110 is smaller than in FIG. 9(B), the pressure P2 of the anode gas increases at a fast rate.

At time t2, the anode pressure control valve 230 is set to be fully closed (OFF) since the pressure P2 of the anode gas increases to the pulsation upper limit pressure P2_up. In this way, the supply of the anode gas to the fuel cell stack 110 is stopped. In this state, the anode gas supplied to the fuel cell stack 110 is consumed by the power generation reaction, wherefore the anode gas present in the fuel cell stack 110 decreases and the anode gas pressure P2 decreases.

Since the anode gas is excessively supplied to the fuel cell stack 110 for an anode gas supply time from time t1 to time t2, it takes time to consume the anode gas in the fuel cell stack 110 during a non-supply time Tns from time t2.

Since the pressure P2 of the anode gas decreases to the pulsation lower limit pressure P2_dn at time t3, the anode pressure control valve 230 is set to be fully open again, the anode gas is supplied to the fuel cell stack 110 from the anode pressure control valve 230 and the pressure P2 of the anode gas increases.

As just described, the pressure P2 of the anode gas is pulsated by alternately switching the pulsation upper limit pressure P2_up and the pulsation lower limit pressure P2_dn corresponding to the required load Lreq with reference to the pulsation control map shown in FIG. 6. In this way, the anode off-gas can be sucked at a flow rate necessary to humidify the fuel cells and supplied to the fuel cell stack 110 by the ejector 240.

FIG. 9(B) is a chart showing the pulsating waveform of the anode gas pressure when the required load is large in the low load region. In FIG. 9(B), the waveform of the anode gas pressure P2 and the open and closed states of the anode pressure control valve 230 are shown using a common time axis as in FIG. 9(A).

In FIG. 9(B), the pressure P2 of the anode gas is pulsated by alternately switching the pulsation upper limit pressure P2_up and the pulsation lower limit pressure P2_dn corresponding to the required load Lreq as in FIG. 9(A) since the required load Lreq is smaller than the switching point Lsw.

Since the required load Lreq is larger than the required load in FIG. 9(A), the pulsation lower limit pressure P2_dn becomes higher than the pulsation lower limit pressure shown in FIG. 9(A) as shown in FIG. 6 and a pulsation width ΔP is narrower than the pulsation width ΔP shown in FIG. 9(A).

Here, the reason why the pulsation width ΔP can be reduced as the required load Lreq increases is described.

First, since the consumption amount of the anode gas consumed in the fuel cell stack 110 increases as the required load Lreq increases, an extra amount of the anode gas supplied to the fuel cell stack 110 when the anode pressure control valve 230 is opened for a fixed time decreases. Thus, the non-supply time Tns becomes shorter as the required load Lreq increases. Since a reduction width of the anode gas pressure P2 becomes smaller as the non-supply time Tns becomes shorter, the pulsation width ΔP is reduced.

Together with this, the anode gas pressure P2 is reduced at a faster rate during the non-supply time Tns with an increase of the consumption amount of the anode gas consumed in the fuel cell stack 110 as the required load Lreq increases. Thus, a pulsation cycle of pulsating the anode gas pressure P2 becomes shorter.

As just described, in the pulsating pressure control of supplying the anode gas to the ejector 240 in a pulsed manner by opening the anode pressure control valve 230 for a fixed period to circulate the anode off-gas, the pulsation width ΔP is reduced as the required load Lreq increases. In the present embodiment, the pulsation upper limit pressure P2_up and the pulsation lower limit pressure P2_dn are so set in the pulsation control map that the open time of the anode pressure control valve 230 becomes constant as shown in FIG. 6.

FIG. 9(C) is a chart showing the waveform of the anode gas in the high load region. In FIG. 9(C), the waveform of the anode gas pressure P2 and the open and closed states of the anode pressure control valve 230 are shown using a common time axis as in FIGS. 9(A) and 9(B).

In FIG. 9(C), the required load Lreq is larger than the switching point Lsw. Here, since the pulsation upper limit pressure P2_up and the pulsation lower limit pressure P2_dn corresponding to the required load Lreq are set at the same value as shown in FIG. 6, the anode pressure control valve 230 is set to be fully open so that the pressure P2 of the anode gas is a constant target pressure. In this way, the pulsation width ΔP of the anode gas pressure is eliminated.

Further, since the required load Lreq is larger than the switching point Lsw, the circulation flow rate of the anode off-gas circulated by the ejector 240 satisfies the flow rate necessary to humidify the fuel cells even if the pressure supplied to the ejector 240 from the anode pressure control valve 230 is constant.

As just described, it is possible to suppress a reduction in the durability of the MEAs 11 while maintaining the wet/dry state of the MEAs 11 by circulating the anode off-gas to the fuel cell stack 110 by the ejector 240 and suppressing the pulsation of the anode gas pressure to the fuel cell stack 110.

Figure 10:
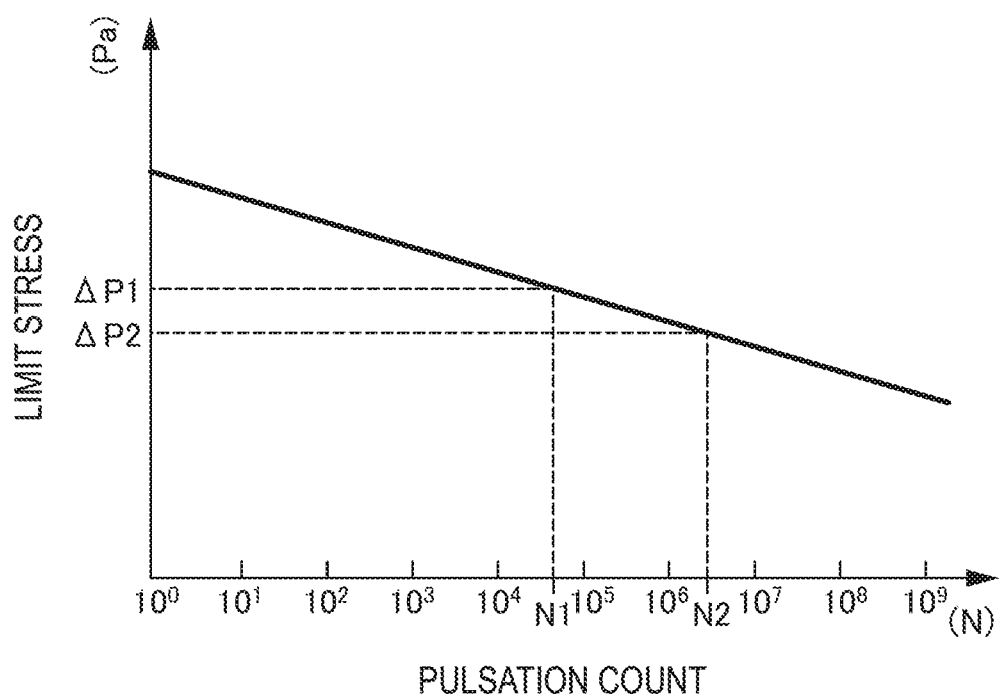
FIG. 10 is a graph showing a relationship of a pulsation width of the anode gas pressure and the durability of the fuel cells.

FIG. 10 is a graph showing a relationship of the pulsation width ΔP of the anode gas pressure and the durability of the fuel cells. Here, a vertical axis represents a limit value of a stress generated in the MEA 11 by the pulsation width ΔP (limit stress) and a horizontal axis represents a repeat count (pulsation count) N of the stress generated in the MEA 11 in a logarithmic scale.

In the fuel cell stack 110, the stress generated in the MEA 11 becomes particularly large at boundary parts between the anode gas diffusing part 21 and the anode gas flow passages 24 and gas seal members provided such as on outer peripheral parts of the anode gas flow passages 24. If a stress exceeding the limit stress is generated in these places, the gas seal members are broken and the anode gas, produced water and the like leak.

As shown in FIG. 10, the limit stress of the MEA 11 is reduced as the pulsation count N increases. Specifically, the durability of the fuel cell stack 110 is reduced as the pulsation count N increases.

For example, the pulsation count permissible by the MEA 11 is up to N1 when the anode gas pressure is pulsated with the pulsation width ΔP. On the other hand, the pulsation count permissible by the MEA 11 is up to N2 when the anode gas pressure is pulsated with a pulsation width ΔP2 narrower than the pulsation width ΔP1. Thus, the pulsation count N can be increased more than ten times by suppressing the pulsation width from ΔP1 to ΔP2.

Accordingly, a reduction of the limit stress is suppressed by narrowing the pulsation width ΔP of the anode gas pressure as the required load Lreq increases as shown in FIG. 6. Thus, a reduction in the durability of the fuel cell stack 110 can be suppressed.

Next, the operation of the fuel cell system 100 in the present embodiment is described with reference to FIGS. 11 and 12.

Figure 11:
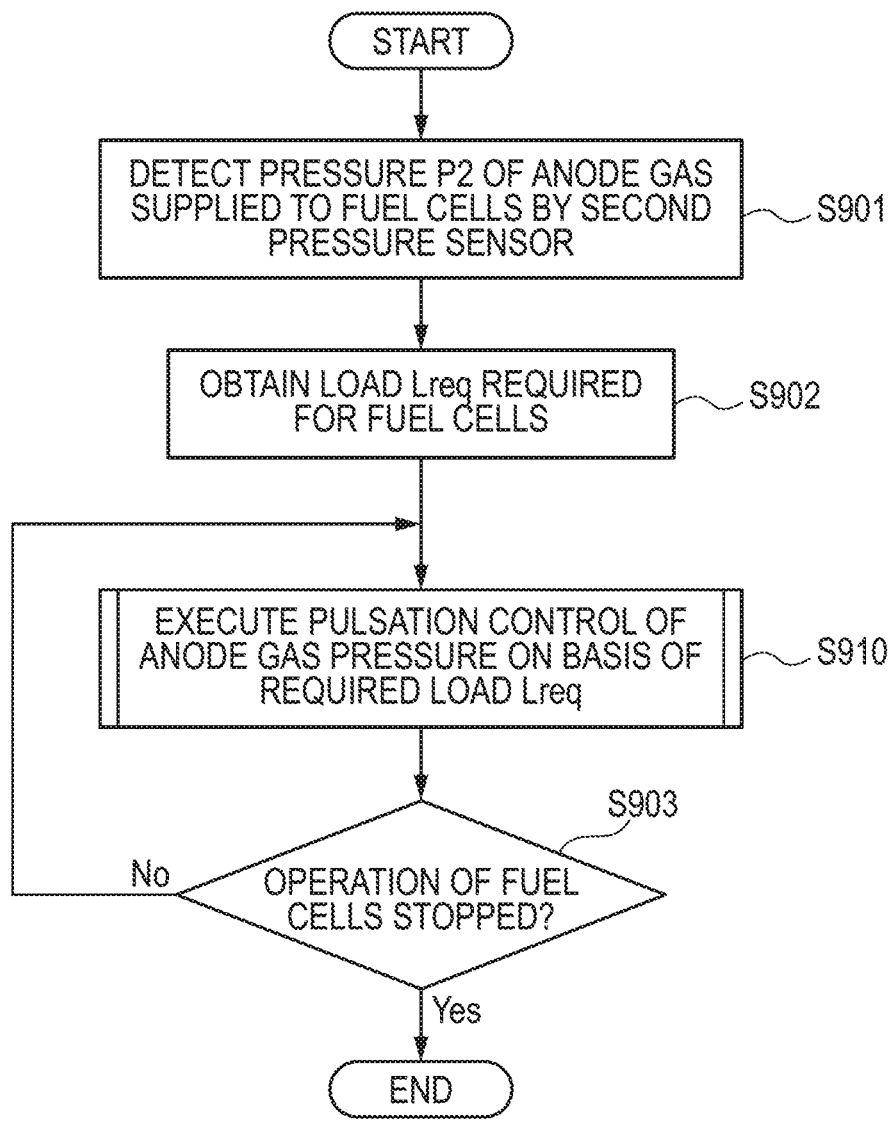
FIG. 11 is a flow chart showing an example of a control method for fuel cell system by a controller.

FIG. 11 is a flow chart showing one example of a control method for controlling the fuel cell system 100 of the present embodiment.

First, when a start-up switch of the fuel cell system 100 is switched ON from OFF, the controller 400 performs a start-up processing of the fuel cell system 100.

Then, in Step S901, the controller 400 obtains a detection signal indicating the pressure P2 of the anode gas output from the second pressure sensor 420.

Thereafter, in Step S902, the controller 400 obtains the load (generated power) Lreq required by the fuel cell stack 110. For example, the required load Lreq is calculated on the basis of the depressed amount detected by the accelerator stroke sensor 510.

In Step S910, the controller 400 executes the pulsation control determined to pulsate the pressure P2 of the anode gas on the basis of the obtained required load Lreq. The pulsation control is described in detail later with reference to FIG. 12.

Thereafter, in Step S903, the controller 400 judges whether or not the operation of the fuel cell stack 110 has been stopped. For example, when detecting that the start-up switch of the fuel cell system 100 has been switched OFF, the controller 400 judges that the operation of the fuel cell stack 110 has been stopped.

The controller 400 returns to Step S910 if it is judged that the operation of the fuel cell stack 110 has not been stopped and repeats a processing of Step S910 until the operation of the fuel cell stack 110 is stopped. On the other hand, the controller 400 finishes the control method of the fuel cell system 100 if it is judged that the operation of the fuel cell stack 110 has been stopped.

Figure 12:
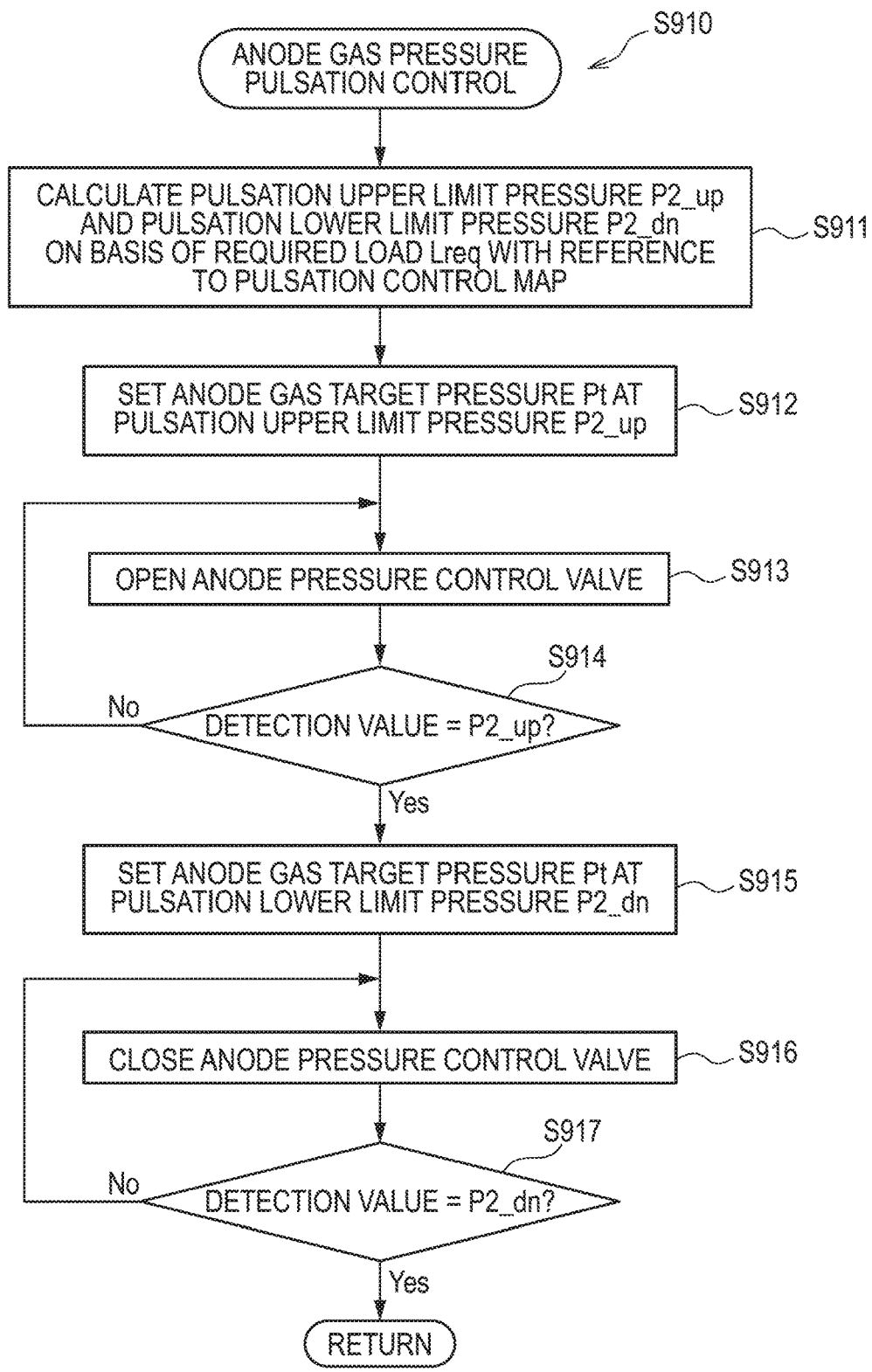
FIG. 12 is a flow chart showing a processing procedure example of a pulsation control of the anode gas pressure.

FIG. 12 is a flow chart showing a processing procedure example of the anode gas pressure pulsation control in S910 executed by the controller 400.

When the required load Lreq is obtained in Step S902, the controller 400 obtains the pulsation upper limit pressure P2_up and the pulsation lower limit pressure P2_dn corresponding to the required load with reference to the pulsation control map shown in FIG. 6 in Step S911.

In Step S912, the controller 400 sets the anode gas target pressure Pt at the pulsation upper limit pressure P2_up.

Then, in Step S913, the controller 400 opens the anode pressure control valve 230. In the present embodiment, the controller 400 sets the anode pressure control valve 230 to be fully open. In this way, the pressure P2 of the anode gas detected by the second pressure sensor 420 increases. It should be noted that the controller 400 may set the opening of the anode pressure control valve 230 at a predetermined value between fully open and fully closed.

In Step S914, the controller 400 judges whether or not the detection value P2 output from the second pressure sensor 420 has increased to the pulsation upper limit pressure P2_up. Then, the controller 400 returns to Step S913 if the pressure P2 of the anode gas has not reached the pulsation upper limit pressure P2_up and maintains a state where the anode pressure control valve 230 is open until the pressure P2 of the anode gas reaches the pulsation upper limit pressure P2_up.

In Step S915, the controller 400 switches the anode gas target pressure Pt from the pulsation upper limit pressure P2_up to the pulsation lower limit pressure P2_dn when the detection value of the second pressure sensor 420 reaches the pulsation upper limit pressure P2_up.

Then, in Step S916, the controller 400 closes the anode pressure control valve 230. In the present embodiment, the controller 400 sets the anode pressure control valve 230 to be fully closed. It should be noted that the controller 400 may set the opening of the anode pressure control valve 230 at a value smaller than the opening set in Step S913 rather than setting the anode pressure control value 230 to be fully closed.

When the anode pressure control valve 230 is closed in Step S916, the anode gas is no longer supplied to the fuel cell stack 110. In this state, the anode gas corresponding to the required load Lreq is consumed by the power generation reaction in the fuel cell stack 110, wherefore the pressure P2 of the anode gas decreases.

In Step S917, the controller 400 judges whether or not the detection value P2 output from the second pressure sensor 420 has decreased to the pulsation lower limit pressure P2_dn. Then, the controller 400 returns to Step S916 if the pressure P2 of the anode gas has not reached the pulsation lower limit pressure P2_dn and maintains a state where the anode pressure control valve 230 is closed until the pressure P2 of the anode gas reaches the pulsation lower limit pressure P2_dn.

When the detection value of the second pressure sensor 420 reaches the pulsation lower limit pressure P2_dn, the pulsation control of the anode gas pressure is finished and a return is made to the control method of the fuel cell system 100 shown in FIG. 11 to proceed to Step S903.

As just described, the anode off-gas containing steam is reliably supplied to the fuel cell stack 110 from the ejector 240 by precisely pulsating the pressure P2 of the anode gas using the second pressure sensor 420. Thus, the MEAs 11 can be reliably humidified. Therefore, a reduction in the power generation performance of the fuel cell stack 110 can be more reliably reduced.

It should be noted that although the example of increasing the pressure P2 of the anode gas using the second pressure sensor 420 has been described in the present embodiment, the pressure P2 may be increased with a time during which the anode pressure control valve 230 is open, i.e. the anode gas supply time fixed at a predetermined time. For example, the predetermined time is so set that the pressure P2 of the anode gas reaches from the pulsation lower limit pressure P2_dn to the pulsation upper limit pressure P2_up in the entire range of the required load where the pulsation control is executed.

In the fuel cell system in which the anode gas supply time is fixed, the flow rate of the anode gas supplied to the fuel cell stack 110 is constant regardless of the magnitude of the required load Lreq. Thus, the anode gas is excessively supplied to the fuel cell stack 110 when the required load Lreq is small, wherefore it takes time to consume the excessive anode gas in the fuel cell stack 110.

On the other hand, since the consumption amount of the anode gas in the fuel cell stack 110 increases as the required load Lreq increases, the flow rate of the excessively supplied anode gas decreases. Thus, as shown in FIGS. 9(A) and 9(B), as the required load Lreq increases, a reduction width of the anode gas pressure becomes smaller since the non-supply time Tns until the pressure P2 of the anode gas reaches the pulsation lower limit pressure P2_dn after the anode pressure control valve 230 is closed becomes shorter. Therefore, the pulsation width ΔP can be reduced as the required load Lreq increases.

As just described, the pulsation width ΔP can be reduced according to the required load Lreq while the pressure of the anode gas is pulsated by a simple configuration by fixing the open time of the anode pressure control valve 230 at the predetermined time.

It should be noted that the example of pulsating the supply pressure P1 of the anode gas supplied to the ejector 240 by pulsating the pressure P2 of the anode gas supplied to the fuel cell stack 110 using the second pressure sensor 420 has been described in the present embodiment. However, the supply pressure P1 may be pulsated using the first pressure sensor 410.

According to the first embodiment of the present invention, the fuel cell system 100 supplies the anode gas and the cathode gas to the fuel cell stack 110 and causes the fuel cell stack 110 to generate power according to a load. The fuel cell system 100 includes the anode pressure control valve 230 for adjusting the pressure of the anode gas from the anode gas supply passage 220 and the ejector 240 for circulating the anode off-gas containing steam associated with power generation to the fuel cell stack 110.

The ejector 240 sucks the anode off-gas discharged to the anode gas discharge passage 250 by the anode gas discharged from the anode pressure control valve 230 and circulates the sucked anode off-gas to the fuel cell stack 110. Then, the controller 400 causes the anode pressure control valve 230 to pulsate the pressure of the anode gas supplied to the ejector 240.

Since the anode off-gas is reliably sucked by the ejector 240 in this way, the anode off-gas can be sufficiently circulated to the fuel cell stack 110. Specifically, the circulation flow rate of the anode off-gas circulated to the fuel cell stack 110 by the ejector 240 can be ensured. Thus, excessive anode gas can be efficiently consumed.

In addition to this, since a large amount of steam contained in the anode off-gas is supplied to the fuel cell stack 110 by sufficiently circulating the anode off-gas to the fuel cell stack 110, the drying of the MEAs 11 in the fuel cell stack 110 can be suppressed. Thus, the fuel cell stack 110 can be maintained in a wet/dry state suitable for power generation without providing the fuel cell system with a humidifier for humidifying the cathode gas. Therefore, a reduction in the power generation performance of the fuel cell stack 110 can be suppressed by a simple configuration.

Further, since the supply flow rate of the anode gas supplied to the ejector 240 decreases as the required load Lreq decreases, the circulation flow rate of the anode off-gas is reduced to become zero.

Thus, the controller 400 increases the pressure P2 of the anode gas to the pulsation upper limit pressure P2_up necessary to circulate the anode off-gas only when the required load Lreq is smaller than the predetermined switching point Lsw as shown in FIG. 6. As shown in FIG. 7, the switching point Lsw is a threshold value determined on the basis of the circulation flow rate Qh of the anode off-gas necessary to humidify the fuel cells.

In this way, in the constant pressure control, the pressure P2 of the anode gas can be pulsated only in a region where the anode off-gas is not sufficiently circulated. Thus, an unnecessary pulsation control can be suppressed.

On the other hand, when the required load Lreq is larger than the switching point (threshold value), the controller 400 controls the anode pressure control valve 230 such that the pressure P2 of the anode gas becomes a constant pressure without being pulsated.

As just described, a reduction in the durability of the fuel cell stack 110 can be suppressed as shown in FIG. 10 by limiting or prohibiting the pulsation control of the anode gas when the circulation flow rate necessary to humidify the fuel cells can be sufficiently ensured.

Further, in the present embodiment, the controller 400 increases the pulsation lower limit pressure P2_dn of the anode gas to reduce the pulsation width ΔP as the required load Lreq increases in the range from the load Lh to the switching point Lsw as shown in FIG. 6. Specifically, the pulsation width ΔP is reduced more when the required load Lreq is large than when the required load Lreq is small.

In this way, the pulsation width ΔP of the anode gas is reduced as the required load Lreq increases. Thus, the pulsation count N can be increased about ten times as shown in FIG. 10 and a reduction in the durability of the fuel cell stack 110 can be suppressed.

It should be noted that the required flow rate of the anode gas calculated on the basis of the required load Lreq, the detection value of the supply flow rate of the anode gas supplied to the ejector 240 or the like may be used instead of the required load Lreq.

Further, in the present embodiment, the second pressure sensor 420 for detecting the pressure P2 of the anode gas supplied to the fuel cell stack 110 is provided in a part of the anode gas supply passage 220 downstream of the ejector 240. The controller 400 controls the pressure P2 of the anode gas to the pulsation lower limit pressure P2_dn determined on the basis of the required load Lreq and increases the pressure P2 of the anode gas to the pulsation upper limit pressure P2_up determined to humidify the fuel cell stack 110.

As just described, a reduction in the circulation flow rate of the anode gas circulated to the fuel cell stack 110 by the ejector 240 can be more reliably avoided by pulsating the pressure of the anode gas using the second pressure sensor 420.

(Second Embodiment)

Figure 13:
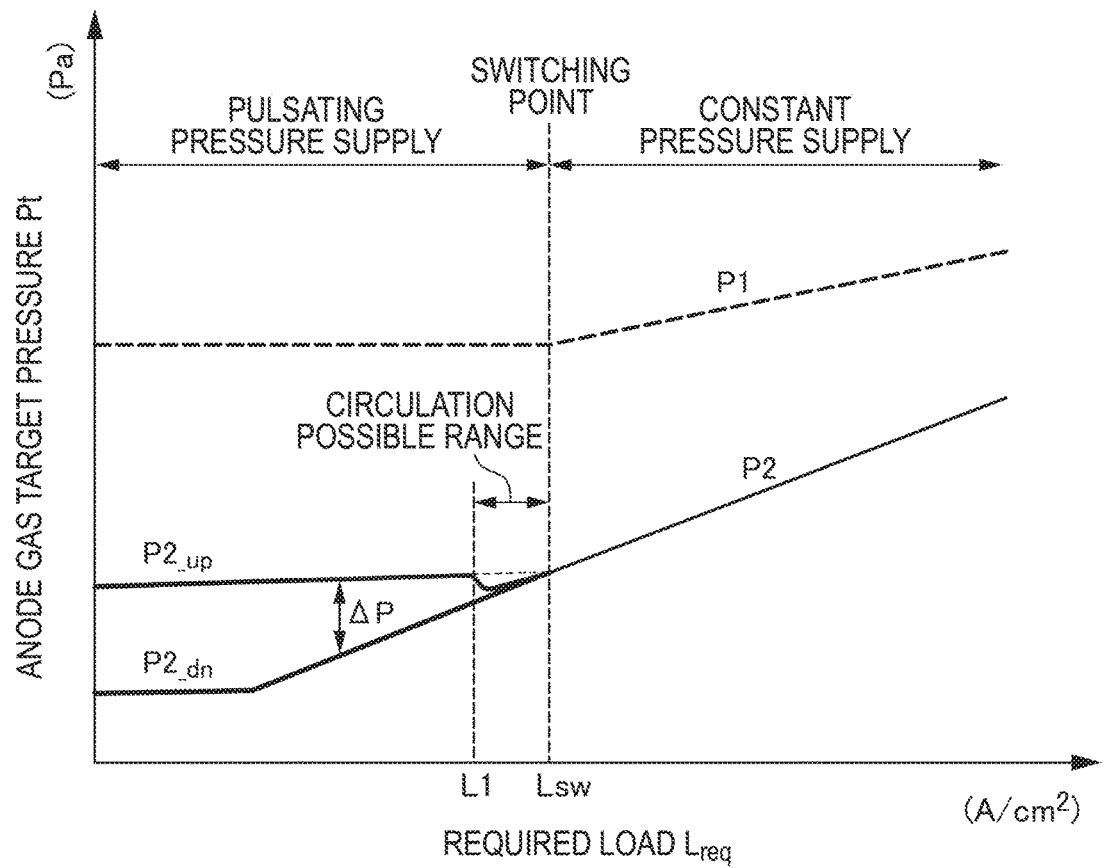
FIG. 13 is a graph showing an example of a pulsation control map in a second embodiment of the present invention.

FIG. 13 is a graph showing an example of a pulsation control map in a second embodiment of the present invention. The pulsation upper limit pressure P2_up shown in FIG. 6 is shown in dotted line in FIG. 13.

In the pulsation control map of the present embodiment, a pulsation upper limit pressure P2_up is set lower than the pulsation upper limit pressure shown in dotted line until a circulation flow rate of anode off-gas becomes zero as shown in FIG. 7 in a circulation possible range from a load L1 to a switching point Lsw. It should be noted that the load L1 is determined on the basis of the circulation limit flow rate Qlim of the ejector 240 shown in FIG. 7.

As just described, the pulsation upper limit pressure P2_up is reduced according to the circulation flow rate of the anode off-gas in the circulation possible range from the lower limit value L1 of the required load capable of circulating the anode off-gas by a constant pressure control to the switching point Lsw.

Since this makes a pulsation width ΔP smaller than in the first embodiment in the circulation possible range, a reduction in the durability of a fuel cell stack 110 can be suppressed while MEAs 11 are humidified.

(Third Embodiment)

A fuel cell system in a third embodiment of the present invention is described. Since a basic configuration of the fuel cell system in the present embodiment is the same as that of the fuel cell system 100 shown in FIG. 4, the same components as those of the fuel cell system 100 are denoted by the same reference signs.

When MEAs 11 of a fuel cell stack 110 are in a wet state, it is possible to reduce a circulation flow rate of anode off-gas supplied to the fuel cell stack 110 from an ejector 240.

Accordingly, in the present embodiment, a plurality of pulsation control maps determined for each wet/dry state of the fuel cell stack 110 are stored in a controller 400.

Figure 14:
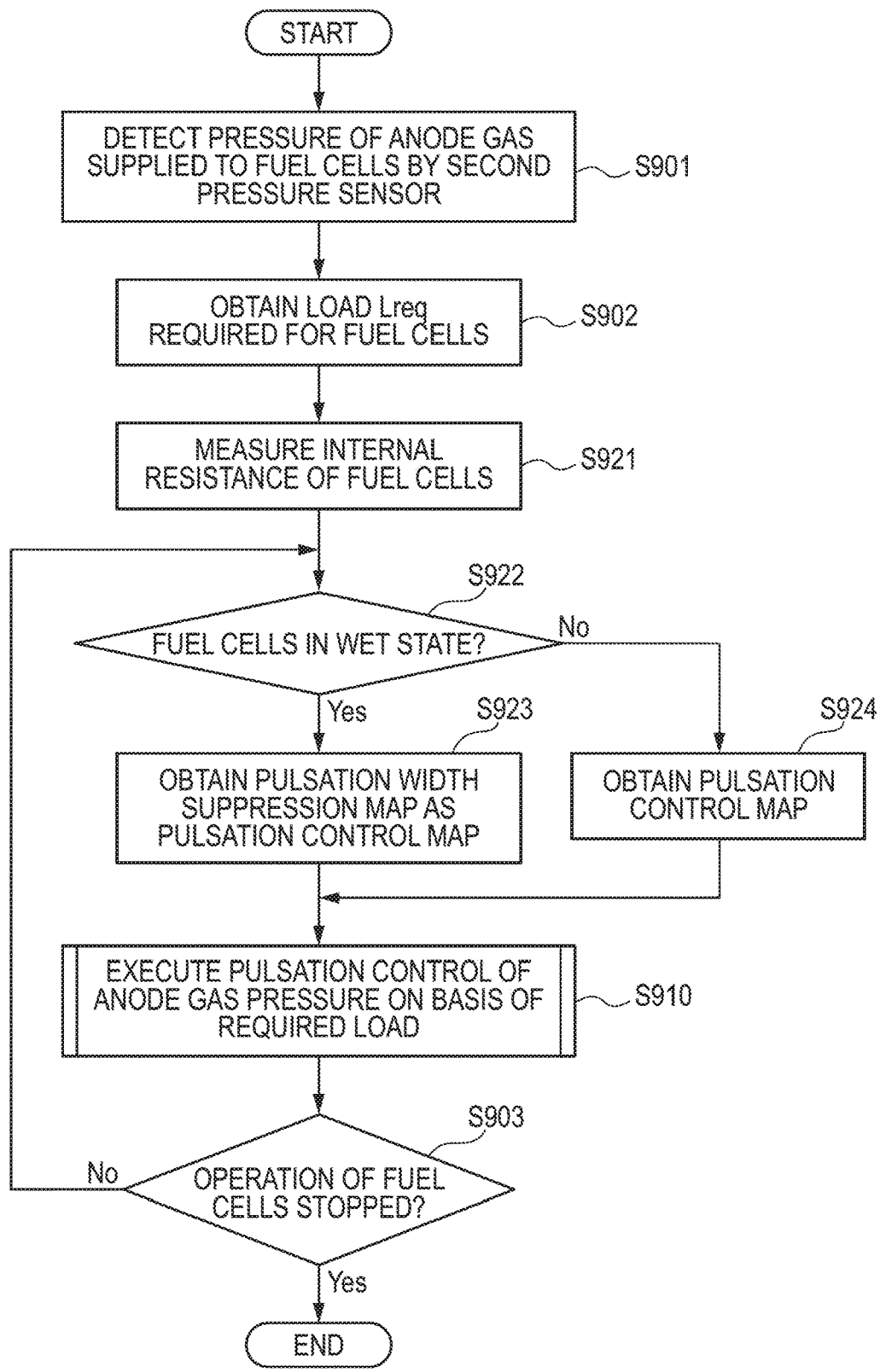
FIG. 14 is a flow chart showing a control method for fuel cell system in a third embodiment of the present invention.

FIG. 14 is a flow chart showing a control method for the fuel cell system 100 in the present embodiment.

Here, a pulsation width suppression map is stored in the controller 400 as a pulsation control map when the MEAs 11 are in a wet state in addition to the pulsation control map shown in FIG. 6. The pulsation width suppression map is obtained by shifting a switching point Lsw of the pulsation control map by a predetermined width toward a low load side.

Since processings of Steps S921 to S924 are added to the processings shown in FIG. 11 in FIG. 14, only these processings are described.

In Step S921, the controller 400 obtains an internal resistance of the fuel cell stack 110 measured by an internal resistance measuring device 520 after obtaining a required load Lreq in Step S902.

It should be noted that, for example, the internal resistance measuring device 520 supplies an alternating current of the same frequency to both a positive electrode terminal and a negative electrode terminal of the fuel cell stack 110 and adjusts an amplitude of the alternating current such that an alternating-current potential difference between the positive electrode terminal and a mid-point terminal of the fuel cell stack 110 and an alternating-current potential difference between the negative electrode terminal and the mid-point terminal match. With the both alternating-current potential differences matched, the internal resistance measuring device 520 calculates the internal resistance by dividing the amplitude of the alternating current by that of the alternating-current potential difference.

In Step S922, the controller 400 determines whether or not the fuel cell stack 110 is in a wet state on the basis of the internal resistance obtained in Step S921. It should be noted that the fuel cell stack 110 can be estimated to be in a wetter state as the internal resistance of the fuel cell stack 110 decreases.

In the present embodiment, the controller 400 determines that the interior of the fuel cell stack 110 is not in a wet state if the internal resistance of the fuel cell stack 110 is larger than a predetermined wet/dry threshold value. On the other hand, the controller 400 determines that the interior of the fuel cell stack 110 is in a wet state if the internal resistance of the fuel cell stack 110 is not larger than the wet/dry threshold value. It should be noted that the wet/ dry threshold value is determined on the basis of an internal resistance value when the fuel cell stack 110 is in a sufficiently wet state using experimental data or the like.

If it is determined in Step S923 that the fuel cell stack 110 is in a sufficiently wet state, the controller 400 selects the pulsation width suppression map, in which the switching point Lsw is shifted by a predetermined width toward the low load side, out of two pulsation control maps. The predetermined width is determined on the basis of the circulation flow rate of the anode off-gas necessary to humidify the MEAs 11 under conditions when the wet/dry threshold value was determined.

On the other hand, if it is determined in Step S923 that the fuel cell stack 110 is not in a wet state, the controller 400 selects the pulsation control map shown in FIG. 6 out of the two pulsation control maps.

Then, in Step S910, the controller 400 pulsates the pressure P2 of the anode gas supplied to the fuel cell stack 110 on the basis of the required load Lreq with reference to the selected pulsation control map. When the operation of the fuel cell stack 110 is stopped in Step S903, the control method for the fuel cell system in the present embodiment is finished.

It should be noted that the example of determining the wet/dry state of the fuel cell stack 110 on the basis of the internal resistance of the fuel cell stack 110 has been described in the present embodiment, the wet/dry state of the fuel cell stack 110 may be determined on the basis of the temperature of the fuel cell stack 110 or the temperature of cooling water. For example, since the amount of produced water increases and the temperature of the fuel cell stack 110 increases as the amount of power generation of the fuel cell stack 110 increases, the wet/dry state of the fuel cell stack 110 is determined utilizing this relationship.

Further, a constant pressure control map for a constant pressure control of the pressure P1 of the anode gas may be used when a state where water outflows into the anode gas flow passages 24 in the fuel cell stack 110, i.e. when so-called flooding possibly occurs.

For example, in Step S922, the controller 400 selects the constant pressure control map if the internal resistance of the fuel cell stack 110 is smaller than a predetermined flooding threshold value smaller than the wet/dry threshold value. In this way, flooding that is induced by the circulation of the anode off-gas can be suppressed.

Figure 15:
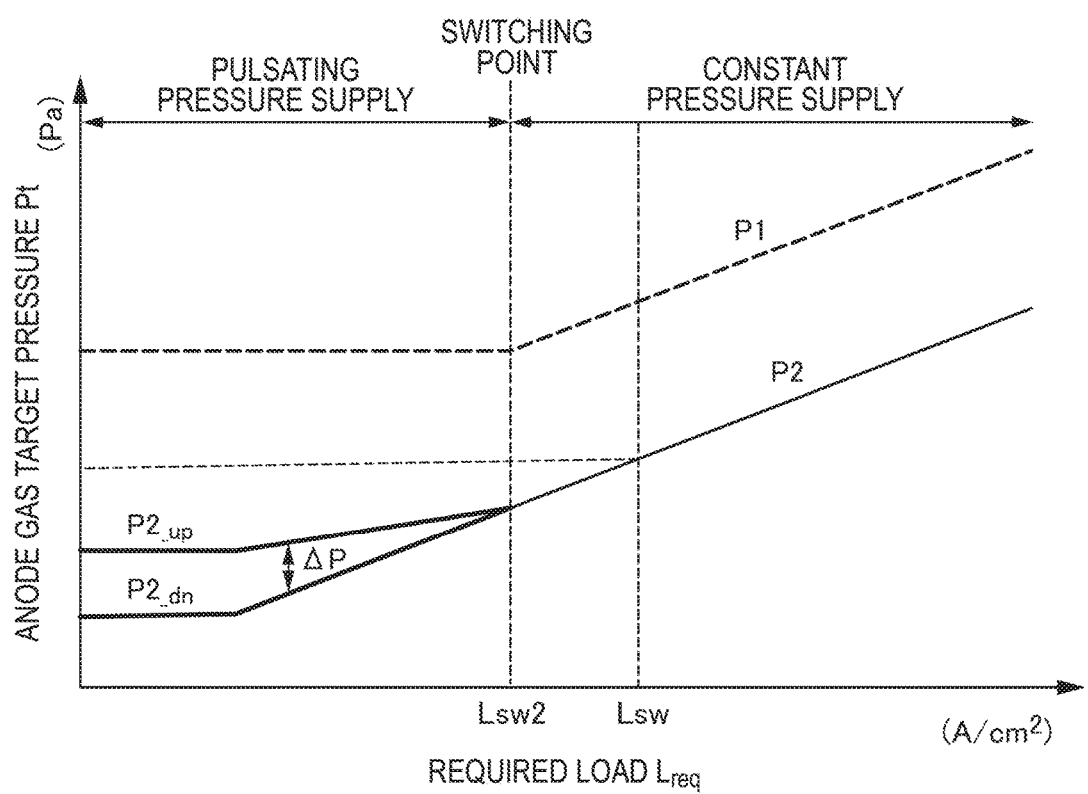
FIG. 15 is a graph showing an example of a pulsation width suppression map to be stored in the controller.

FIG. 15 is a graph showing an example of the pulsation width suppression map stored in the controller 400. In FIG. 15, the pulsation upper limit pressure P2_up shown in FIG. 6 is shown in dotted line.

When the MEAs 11 are sufficiently wet, the circulation flow rate of the anode off-gas discharged from the ejector 240 can be reduced. Thus, a switching point Lsw2 can be set on a lower load side than the switching point Lsw.

In the pulsation width suppression map, the switching point Lsw2 is set on the lower load side than the switching point Lsw shown in FIG. 6 since the MEAs 11 are in a wet state.

Thus, in a variable range of the required load Lreq, a ratio of the pulsating pressure supply becomes smaller, whereas a ratio of the constant pressure supply becomes larger. Thus, a chance of executing the pulsation control can be reduced as compared to the pulsation control map shown in FIG. 6. Therefore, the durability of the fuel cell stack 110 can be improved.

Further, in the pulsation width control map, a pulsation upper limit pressure P2_up is set to be lower than the pulsation upper limit pressure shown in FIG. 6. Since this makes the pulsation width AP smaller as compared to the pulsation control map shown in FIG. 6, a reduction in the durability of the fuel cell stack 110 can be further suppressed.

According to the third embodiment of the present invention, the controller 400 changes the switching point Lsw for pulsating the pressure of the anode gas supplied to the fuel cell stack 110 according to the wet/dry state of the fuel cell stack 110.

Specifically, the controller 400 sets the switching point Lsw smaller when the MEAs 11 are in a wet state than when the MEAs 11 are in a dry state. Specifically, the controller 400 selects the pulsation width suppression map with the smaller switching point out of the plurality of pulsation control maps as the internal resistance of the fuel cell stack 110 decreases.

In this way, a reduction in the durability of the fuel cell stack 110 due to the pulsation control can be suppressed as compared to the second embodiment.

(Fourth Embodiment)

Figure 16:
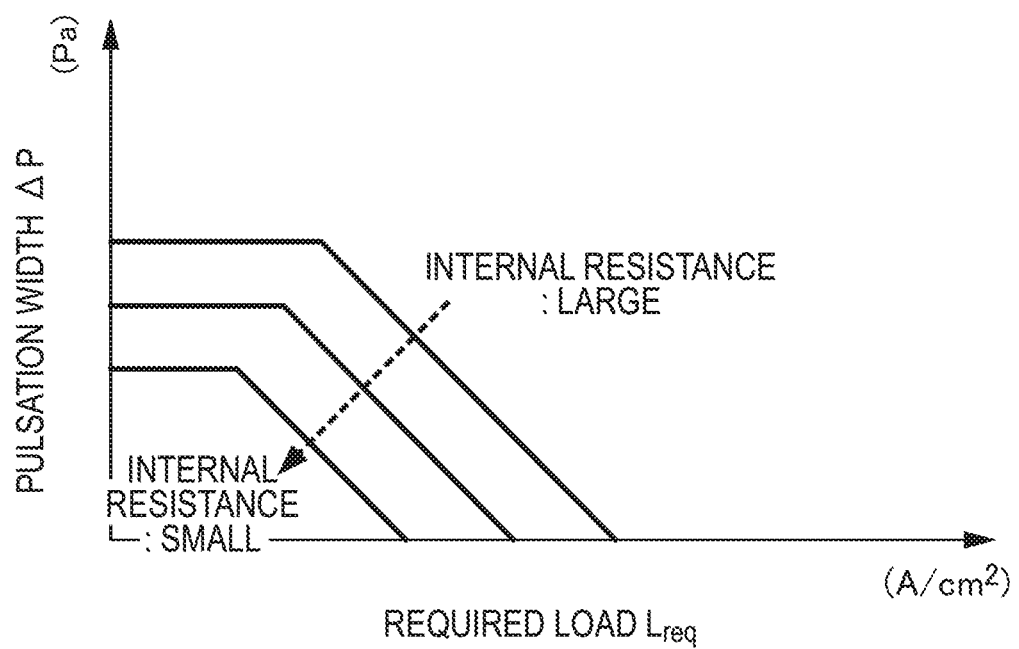
FIG. 16 is a graph showing an example of a pulsation width map in a fourth embodiment of the present invention.

FIG. 16 is a graph showing an example of a pulsation width map in a fourth embodiment of the present invention. Here, a horizontal axis represents a required load Lreq and a vertical axis represents a pulsation width $\Delta P$ of an anode gas pressure. The pulsation width map is stored in a controller 400.

In the present embodiment, the controller 400 calculates the pulsation width $\Delta P$ corresponding to the required load Lreq with reference to the pulsation width map. Together with this, the controller 400 calculates a pulsation lower limit pressure P2_dn corresponding to the required load Lreq with reference to the pulsation control map shown in FIG. 6 and calculates a pulsation upper limit pressure P2_up by adding the pulsation width $\Delta P$ to the pulsation lower limit pressure P2_dn.

In this way, the controller 400 obtains the pulsation upper limit pressure P2_up and the pulsation lower limit pressure P2_dn and pulsates a pressure P2 of the anode gas by alternately setting these as a target pressure Pt of the anode gas.

As shown in FIG. 16, as an internal resistance of a fuel cell stack 110 decreases, the pulsation width $\Delta P$ is set at a smaller value since MEAs 11 are in a wetter state. Thus, a point where the pulsation width $\Delta P$ is zero, i.e. a switching point Lsw of a pulsation control map can be made smaller toward a low load side.

According to the fourth embodiment of the present invention, the controller 400 reduces the pulsation width $\Delta P$ of the anode gas pressure according to a wet state of the MEAs 11, wherefore a reduction in the durability of the fuel cell stack 110 can be suppressed.

It should be noted that although the example of calculating the pulsation upper limit pressure P2_up by adding the pulsation width $\Delta P$ obtained from the pulsation width map to the pulsation lower limit pressure P2_dn has been described in the present embodiment, there is no limitation to this.

For example, the controller 400 may calculate the pulsation lower limit pressure P2_dn by subtracting the pulsation width $\Delta P$ obtained from the pulsation width map from the pulsation upper limit pressure P2_up shown in FIG. 6. In this case, since a higher circulation flow rate of anode off-gas supplied from the ejector 240 can be ensured as compared to the fourth embodiment, a wet state of the MEAs 11 is easily maintained while a reduction in the durability of the fuel cell stack 110 is suppressed.

As described in the first to fourth embodiments, the controller 400 pulsates the pressure of the anode gas supplied to the ejector 240 so that the anode off-gas is supplied to the fuel cell stack 110 at the circulation flow rate Qh necessary to humidify the fuel cells shown in FIG. 7. Further, the controller 400 reduces the circulation flow rate Qh in a state where the fuel cell stack 110 is sufficiently wet and reduces the circulation flow rate Qh according to an increase of steam in the anode off-gas associated with a temperature increase of the fuel cell stack 110.

Although the embodiments of the present invention have been described above, the above embodiments are merely an illustration of some application examples of the present invention and not intended to limit the technical scope of the present invention to the specific configurations of the above embodiments.

For example, although the example of pulsating the pressure P2 of the anode gas using the detection signal of the second pressure sensor 420 has been described in the above embodiments, the controller 400 may include a measurement counter and switch the pulsation upper limit pressure P2_up and the pulsation lower limit pressure P2_dn from one to another according to the elapse of time. For example, the controller 400 may switch the anode gas target pressure Pt from the pulsation lower limit pressure P2_dn to the pulsation upper limit pressure P2_up every time a switching time determined by an experiment or the like elapses and return the target pressure Pt to the pulsation lower limit pressure P2_dn and reset the measurement counter after the elapse of a pressure increasing time determined in advance.

Further, although the example of providing only one ejector 240 has been described in the above embodiments, a plurality of ejectors 240 may be provided. This enables the switching point Lsw of the pulsation control map to be shifted toward the low load side.

Further, the anode pressure control valve 230 may be an ON/OFF valve or a solenoid valve.

It should be noted that the above embodiments can be combined as appropriate.

The invention claimed is:

1. A fuel cell system for supplying anode gas and cathode gas to a fuel cell and causing the fuel cell to generate power according to a load, comprising:
 a supply passage configured to supply the anode gas to the fuel cell;
 a pressure control valve provided in the supply passage, the pressure control valve being configured to adjust a pressure of the anode gas supplied to the fuel cell;
 a discharge passage configured to discharge the anode gas from the fuel cell;
 an ejector provided in the supply passage, the ejector being configured to suck the anode gas discharged to the discharge passage and circulate the anode gas to the fuel cell using the anode gas supplied from the pressure control valve; and
 a controller configured to control the pressure control valve such that the pressure of the anode gas supplied to the fuel cell via the ejector is larger than a predetermined pressure to pulsate the pressure of the anode gas.

2. The fuel cell system according to claim 1, wherein the predetermined pressure is set such that a supply flow rate of the anode gas is larger than a circulation limit flow rate and a circulation flow rate of the anode gas becomes zero.

3. The fuel cell system according to claim 1, further comprising:
 a sensor configured to detect the pressure of the anode gas supplied to the fuel cell from the ejector,
 wherein the controller is configured to pulsate the pressure of the anode gas supplied to the fuel cell on a basis of a signal from the sensor and target values of predetermined upper limit pressure and lower limit pressure.

4. The fuel cell system according to claim 1, wherein:
 the controller is configured to pulsate the pressure of the anode gas when a parameter indicating the load or a supply flow rate of the anode gas supplied to the ejector is smaller than a threshold value determined in advance; and
 the threshold value is determined in advance on a basis of a circulation flow rate determined such that a minimum amount of steam necessary to humidify the fuel cell is supplied to the fuel cell when the anode gas is circulated.

5. The fuel cell system according to claim 4, wherein:
 when the parameter is larger than the threshold value, the controller is configured to not pulsate the pressure of the anode gas.

6. The fuel cell system according to claim 4, wherein:
 the controller is configured to make a pulsation width at a time of pulsating the pressure of the anode gas smaller when the parameter is large than when the parameter is small.

7. The fuel cell system according to claim 1, wherein:
 when pulsating the pressure of the anode gas, the controller is configured to increase the pressure of the anode gas by opening the pressure control valve for a predetermined time.

8. The fuel cell system according to claim 4, wherein:
 the controller is configured to make the threshold value smaller when the fuel cell is in a wet state than when the fuel cell is in a dry state.

9. The fuel cell system according to claim 8, wherein:
 the controller is configured to reduce a pulsation upper limit pressure of the anode gas according to the circulation flow rate to make a pulsation width smaller in a range of the parameter from a value of making the circulation flow rate of the anode gas zero in a constant pressure control of making the pressure of the anode gas constant to the threshold value.

10. A control method for a fuel cell system with a supply passage for supplying anode gas to a fuel cell, a pressure control valve provided in the supply passage, a discharge passage for discharging the anode gas from the fuel cell, and an ejector for sucking the anode gas discharged to the discharge passage and circulating the anode gas to the fuel cell using the anode gas supplied from the pressure control valve, the control method comprising:
 a control step of controlling a pressure of the anode gas supplied to the fuel cell on a basis of a load of the fuel cell; and
 a pulsation control step of controlling the pressure of the anode gas supplied to the fuel cell via the ejector so as to be larger than a predetermined pressure to pulsate the pressure of the anode gas.

11. The fuel cell system according to claim 1, further comprising the fuel cell configured to receive the anode gas and the cathode gas and generate power.

12. The fuel cell system according to claim 1, wherein:
 the ejector comprises a nozzle and a diffuser,
 the nozzle is configured to accelerate a flow velocity of the anode gas supplied from the pressure control valve and inject the anode gas to the diffuser, and
 the diffuser is configured to suck the anode gas discharged to the discharge passage and circulate the anode gas supplied from the pressure control valve and the anode gas discharged to the discharge passage to the fuel cell.

13. The fuel cell system according to claim 12, wherein:
 a supply flow rate of the anode gas supplied to the nozzle is calculated on a basis of the required load and corresponds to an amount of the anode gas consumed as power is generated by the fuel cell, and
 the diffuser is configured to discharge the anode gas supplied from the pressure control valve and the anode gas discharged to the discharge passage to the fuel cell at an anode gas total flow rate obtained by adding a circulation flow rate of the anode gas discharged to the discharge passage and the supply flow rate of the anode gas injected from the nozzle.

14. The fuel cell system according to claim 1, wherein:
the controller is configured to control the pressure control valve such that the pressure of the anode gas supplied to the fuel cell via the ejector pulsates between a predetermined upper limit pressure and a predetermined lower limit pressure.

15. The fuel cell system according to claim 14, wherein:
the predetermined upper limit pressure is set such that a flow rate ratio of a circulation flow rate of the anode gas discharged to the discharge passage to a flow rate of the anode gas consumed by the fuel cell is a predetermined percentage.

16. A fuel cell system comprising:
a fuel cell that receives anode gas and cathode gas and generates power according to a load;
a high-pressure tank that stores and supplies anode gas to the fuel cell;
a supply passage that connects the high-pressure tank and the fuel cell;
a pressure control valve provided in the supply passage that adjusts a pressure of the anode gas supplied by the high-pressure tank;
a discharge passage that discharges anode off-gas from the fuel cell;
an ejector provided in the supply passage downstream of the pressure control valve, wherein the ejector sucks the anode off-gas discharged to the discharge passage using the anode gas supplied from the pressure control valve, and circulates the anode off-gas and the anode gas supplied from the pressure control valve as the anode gas supplied to the fuel cell; and
a controller programmed to control the pressure control valve such that a pressure of the anode gas supplied to the fuel cell via the ejector is larger than a predetermined pressure to pulsate the pressure of the anode gas.

* * * * *